(12) United States Patent
Reznik

(10) Patent No.: US 8,595,281 B2
(45) Date of Patent: Nov. 26, 2013

(54) TRANSFORMS WITH COMMON FACTORS

(75) Inventor: Yuriy Reznik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1204 days.

(21) Appl. No.: 11/621,945

(22) Filed: Jan. 10, 2007

(65) Prior Publication Data

US 2007/0168410 A1  Jul. 19, 2007

Related U.S. Application Data

(60) Provisional application No. 60/758,464, filed on Jan. 11, 2006.

(51) Int. Cl.
*G06F 17/14* (2006.01)
*G06F 7/52* (2006.01)

(52) U.S. Cl.
USPC .......................................... 708/620; 708/402

(58) Field of Classification Search
USPC ........................... 708/400–402; 382/248, 250
See application file for complete search history.

(56) References Cited

U.S. PATENT DOCUMENTS

| | | |
|---|---|---|
| 4,864,529 A | 9/1989 | Shah et al. |
| 5,233,551 A | 8/1993 | White |
| 5,285,402 A | 2/1994 | Keith |
| 5,642,438 A | 6/1997 | Babkin |
| 5,701,263 A | 12/1997 | Pineda |
| 5,930,160 A | 7/1999 | Mahant-Shetti |
| 6,084,913 A | 7/2000 | Kajiki et al. |
| 6,189,021 B1 | 2/2001 | Shyu |
| 6,223,195 B1 | 4/2001 | Tonomura |
| 6,308,193 B1 | 10/2001 | Jang et al. |
| 6,473,534 B1 | 10/2002 | Merhav et al. |
| 6,757,326 B1 | 6/2004 | Prieto et al. |

(Continued)

FOREIGN PATENT DOCUMENTS

| | | |
|---|---|---|
| CN | 1421102 A | 5/2003 |
| CN | 1719435 A | 1/2006 |

(Continued)

OTHER PUBLICATIONS

Qi H. et al., "High accurate and multiplierless fixed-point DCT," ISO/IEC JTC1/SC29/WG11 M12322, Jul. 2005, Poznan, Poland, Jul. 10, 2005, pp. 1-17.*

(Continued)

*Primary Examiner* — Chuong D Ngo
*Assistant Examiner* — Matthew Sandifer
(74) *Attorney, Agent, or Firm* — Ramin Mobarhan; Brent Boyd

(57) ABSTRACT

Techniques for efficiently performing transforms on data are described. In one design, an apparatus performs multiplication of a first group of at least one data value with a first group of at least one rational dyadic constant that approximates a first group of at least one irrational constant scaled by a first common factor. The apparatus further performs multiplication of a second group of at least one data value with a second group of at least one rational dyadic constant that approximates a second group of at least one irrational constant scaled by a second common factor. Each rational dyadic constant is a rational number with a dyadic denominator. The first and second groups of at least one data value have different sizes. The first and common factors may be selected based on the number of logical and arithmetic operations for the multiplications, the precision of the results, etc.

43 Claims, 8 Drawing Sheets

(56) References Cited

U.S. PATENT DOCUMENTS

| | | | |
|---|---|---|---|
| 6,766,341 B1* | 7/2004 | Trelewicz et al. | 708/400 |
| 6,917,955 B1 | 7/2005 | Botchev | |
| 7,007,054 B1 | 2/2006 | Brady et al. | |
| 7,421,139 B2* | 9/2008 | Hinds et al. | 382/248 |
| 2001/0031096 A1 | 10/2001 | Schwartz et al. | |
| 2002/0009235 A1 | 1/2002 | Schwartz et al. | |
| 2002/0038326 A1 | 3/2002 | Pelton et al. | |
| 2003/0020732 A1 | 1/2003 | Jasa et al. | |
| 2003/0074383 A1* | 4/2003 | Murphy | 708/620 |
| 2004/0117418 A1 | 6/2004 | Vainsencher et al. | |
| 2004/0236808 A1 | 11/2004 | Chen et al. | |
| 2005/0256916 A1 | 11/2005 | Srinivasan et al. | |
| 2006/0008168 A1 | 1/2006 | Lee | |
| 2006/0080373 A1 | 4/2006 | Hinds et al. | |
| 2007/0168410 A1 | 7/2007 | Reznik | |
| 2007/0200738 A1 | 8/2007 | Reznik et al. | |
| 2007/0233764 A1 | 10/2007 | Reznik et al. | |
| 2007/0271321 A1 | 11/2007 | Reznik et al. | |

FOREIGN PATENT DOCUMENTS

| | | |
|---|---|---|
| EP | 1311975 A1 | 5/2003 |
| GB | 2304946 A | 3/1997 |
| JP | 04141158 | 5/1992 |
| JP | 05108820 | 4/1993 |
| JP | H09204417 A | 8/1997 |
| JP | 10322219 A | 12/1998 |
| JP | 1175186 | 3/1999 |
| JP | 2000099495 A | 4/2000 |
| JP | 2002197075 A | 7/2002 |
| JP | 2003528668 | 9/2003 |
| JP | 2005501462 T | 1/2005 |
| JP | 2005327298 A | 11/2005 |
| RU | 2189120 | 9/2002 |
| RU | 2003114715 A | 11/2004 |
| RU | 2273112 | 3/2006 |
| WO | WO9613780 | 9/1996 |
| WO | WO0135673 A1 | 5/2001 |
| WO | WO02101650 A2 | 12/2002 |
| WO | WO02104039 A1 | 12/2002 |
| WO | 03019787 A2 | 3/2003 |

OTHER PUBLICATIONS

Puschel M. et al., "Custom-optimized multiplierless implementations of DSP algorithms," 2004 IEEE/ACM International Conference on Computer Aided Design, Nov. 7-11, 2004, pp. 175-182.*

Hinds A.T. et al., "A Fast and Accurate Inverse Discrete Cosine Transform," IEEE Workshop on Signal Processing Systems, Nov. 2005, pp. 87-92.*

Dempster A.G. et al., "Use of minimun-adder multiplier blocks in FIR digital filters," IEEE Transactions on Circuits and Systems II: Analog and Digital Signal Processing, vol. 42, No. 9, Sep. 1995, pp. 569-577.

Hinds A.T. et al., "A fast and accurate Inverse Discrete Cosine Transform," IEEE Workshop on Signal Processing Systems, 204 Nov. 2005, Athens, Greece, pp. 87-92.

IEEE Std 1180-1190, "IEEE Standard Specifications for the Implementations of 8x8 Inverse Discrete Cosine Transform", CAS Standards Committee of the IEEE Circuits and Systems Society, Dec. 6, 1990.

Puschel M. et al., "Custom-optimized multiplierless implementations of DSP algorithms," 2004 IEEE/ACM International Conference on Computer Aided Design, Nov. 7-11, 2004, San Jose, CA, Nov. 7, 2004, pp. 175-182.

Qi H. et al., "An example of fixed-point IDCT for CFP on fixed-point 8x8 IDCT and DCT standard," ISO/IEC JTC1/SC29/WG11 M12324, Jul. 2005, Poznan, Poland, Jul. 20, 2005, pp. 1-16.

Qi H. et al., "High accurate and multiplierless fixed-point DCT," ISO/IEC JTC1/SC29/WG11 M12322, Jul. 2005, Poznan, Poland, Jul. 20, 2005, pp. 1-17.

Reznik Y. et al., "Fixed point multiplication-free 8x8 DCT/IDCT approximation," ISO/IEC JTC1/SC29/WG11 M12607, Oct. 2005, Nice, France, pp. 1-37.

Reznik Y.A. et al., "Efficient fixed-point approximations of the 8x8 inverse dicrete cosine transform," Applications of Digital Image Processing XXX, Proceedings of SPIE, vol. 6696, Sep. 24, 2007, pp. 669617-1-669671-17.

Reznik Y.A. et el., "Improved proposal for MPEG fixed point 8x8 IDCT standard," ISO/IEC JTC1/SC29WG11 M13001, Jan. 2006, Bangkok, Thailand, pp. 1-22.

Reznik Y.A. et al., "Low Complexity fixed-point approximation of inverse discrete cosine transform," Proceedings of the 2007 IEEE International Conference on Acoustics. Speech, and Signal Processing, Apr. 15-20, 2007, Honolulu, Hawaii, vol. 1, pp. 1109-1112.

Rijavec N. et al., "Multicriterial optimization approach to eliminating multiplications," 2006 IEEE International Workshop on Multimedia Signal Processing, Oct. 3-6, 2006. Victoria, BC. Canada, pp. 368-371.

Sullivan G.L., "Standardization of IDCT approximation behavior for video compression: the history and the new MPEG-C parts 1 and 2 standards," Applications of Digital Image Processing. Proceedings of SPIE, vol. 6696, Sep. 24, 2007, pp. 669611-1-669611-22.

Trelewicz J.G. et al., "Efficient integer implementations for faster linear transforms," Conference Record of the 35th Asilomar Conference on Signals, Systems, & Computers, Nov. 4-7, 2001, Pacific Grove, CA, vol. 2, pp. 1161-1165.

International Search Report—PCT/US07/060405—International Search Authority, European Patent Office—Aug. 4, 2008.

Written Opinion—PCT/US07/060405—International Search Report, European Patent Office—Aug. 4, 2008.

International Preliminary Report on Patentability—PCT/US07/060405—The International Bureau of WIPO, Geneva, Switzerland—Aug. 26, 2008.

"Working Draft 1.0 of ISO/IEC WD 23002-2," Information Technology—MPEG video technologies—Part2: Fixed-point 8x8 IDCT and DCT transforms, ISO/IEC JTC1/SC29/WG11 N7817, Feb. 17, 2006, pp. 1-21.

A. Karatsuba, and Y. Ofman, "Multiplication of Multidigit Numbers on Automata", Soviet Phys. Doklady, vol. 7, No. 7, 595-596, Jan. 1963.

Arai, Y., et al., "A Fast DCT-SQ Scheme for Images", Transactions of the IEICE E 71(11):1095, Nov. 1988, pp. 1095-1097.

Boullis N. et al., "Some optimizations of hardware multiplication by constant matrices," IEEE Transactions on Computers, vol. 54, No. 10, Oct. 2005, pp. 1271-1282.

Bracamonte J et al., "A multiplierless implementation scheme for the JPEG image coding algorithm," Proceedings of the 2000 IEEE Nordic Signal Processing Symposium, Jun. 13-15, 20000, Kolmarden, Sweden, pp. 1-4.

E. Feig and S. Winograd, "Fast Algorithms for the Discrete Cosine Transform", IEEE Transactions on Signal Processing, vol. 40, pp. 2174-2193, Sep. 1992.

E. Feig and S. Winograd, "On the Multiplicative Complexity of Discrete Cosine Transforms (Corresp.)" IEEE Transactions on Information Theory, vol. 38, No. 4, pp. 1387-1391, Jul. 1992.

Feig, E., "A Fast Scaled DCT algorithm", SPIE vol. 1244 Image Processing Algorithms and Techniques (1990), pp. 2-13.

G. Plonka and M. Tasche, "Integer DCT-II by Lifting Steps", International Series of Numerical Mathematics (W. Haussmann, K. Jelter, M. Reimer, J. Stockler (eds.)), vol. 145, Birkhauser, Basel, 2003, pp. 1-18.

G. Plonka and M. Tasche, "Invertible Integer DCT Algorithms", Applied Computational Harmonic Analysis, No. 15 (2003), pp. 70-88.

Harltey R.I. "Subexpression sharing in filters using canonic signed digit multipliers," IEEE Transactions on Circuits and Systems II: Analog and Digital Signal Processing, vol. 43, No. 10, Oct. 1996, pp. 677-688.

ISO/IEC JTC1/SC29/WG11N7292 [Study on FCD] Information Technology—Coding of Moving Pictures and Associated Audio for Digital Storage Media at up to About 1.5 Mbit/s—Part 6: Specification of Accuracy Requirements for Implementation of Inverse Discrete Cosine Transform, pp. 1-8.

(56) References Cited

OTHER PUBLICATIONS

ISO/IEC JTCI/SC29/WG11 N7335, "Call for Proposals on Fixed-Point 8×8 IDCT and DCT Standard", Poznan, Poland, Jul. 2005, pp. 1-18.
J. Liang and T.D. Tran, "Fast Multiplierless Approximations of the DCT with Lifting Scheme", IEEE Transactions on Signal Processing, vol. 49, No. 12, Dec. 2001, pp. 3032-3044.
J. Ziv and A. Lempel, "Compression of Individual Sequences via Variable-rate Coding", IEEE Transactions on Information Theory, vol. IT-24, No. 5, pp. 530-536, Sep. 1978.
Mitchell J.L. et al., "Enhanced parallel processing in wide registers," Proceedings of the 19th IEEE International Parallel and Distributed Processing Symposium, Apr. 3-8, 2005, Denver, Colorado, pp. 1-10.
N. Ahmed, T. Natarajan and K.R. Rao, "Discrete Cosine Transform", IEEE Transactions on Computers, vol. C-23, pp. 90-93, Jan. 1974.
R. Bernstein, "Multiplication by integer Constants", Software-Practice and Experience, vol. 16, No. 7, pp. 641-652, Jul. 1986.
T.M. Cover and J.A. Thomas, "Elements of Information Theory", Wiley, New York, 1991, pp. 1-36.
Voronenko Y. et al., "Multiplierless multiple constant multiplication," ACM Transactions on Algorithms, vol. 3, No. 2, May 2007, pp. 1-38.
W. Chen, C.H. Smith and S.C. Fralick, "A Fast Computational Algorithm for the Discrete Cosine Transform", IEEE Transactions on Communications, vol. com-25, No. 9, pp. 1004-1009, Sep. 1977.
Zelinski A.C. et al., "Automatic cost minimization for multiplierless implementations of discrete signal transforms," Proceedings of the 2004 IEEE International Conference on Acoustics, Speech and Signal Processing, May 17-21, 2004, Montral, Quebec, Canada, pp. 221-224.
International Preliminary Report on Patentability—PCT/US07/060405—European Patent Office—Berlin—Apr. 16, 2009.
C. Loeffler, A. Ligtenberg, and G.S. Moschytz. "Algorithm-Architecture Mapping for Custom DSP Chips," Proc. Int. Symp. Circuits Syst. (Helsinki, Finland), Jun. 1988, pp. 1953-1956.
Dempster, A.G. et al., "Constant integer multiplication using minimum adders," IEEE Proceedings—Circuits, Devices and Systems, vol. 141, No. 5, pp. 407-413, Oct. 1994.
Hung A C et al., "A Comparison of fast inverse discrete cosine transform algorithms" Multimedia Systems, vol. 2. No. 5, Dec. 1994 pp. 204-217.
K.R. Rao, and P.Yip, "Discrete Cosine Transform: Algorithms, Advantages, Applications," Academic Press, San Diego, 1990, pp. 88-106.
Linzer, E., et al.,: "New scaled DCT algorithms for fused multiply/add architectures" Proceedings of the 1991 IEEE Intr. Conf. on Acqustics, Speech and Signal Processing (ICASSP91), May 14-17, 1991 vol. 3, May 1991 pp. 2201-2204.
Pai et al., Low-power data-dependent 8×8 DCT/IDCT for video compression, 2003, IEEE proceedings online No. 20030564, pp. 245-255.
Rao, et al.: "Discrete cosine transform: algorithms, advantages, applications," Academic Press Professional, Inc., San Diego, CA, pp. 490, ISBN: 0-12-580203-X, 1990, CH. 3-4.
Reznik, Y A et al., "Response to CE on Convergence of scaled and non-scaled IDCT architectures" ISO/IEC JTC1/SC29/WG11 M13650, Jul. 2006 Klagenfurt, Austria.
Reznik Y A et al.: "Summary of responses on CE on convergence of IDCT architectures" ISO/IEC CTC1/SC29/WG11 M13467, Jul. 2006, Klagenfurt, Austria.
Taiwan Search Report—TW096101164—TIPO—Dec. 28, 2010.
V. Lefevre, "Moyens Arithmetiques Pour un Calcul Fiable", PhD Thesis, Ecole Normale Superieure de Lyon, Lyon, France, Jan. 2000.
Yuriy A, et al., "Proposed Core Experiment (on Exploration) on Convergence of Scaled and Non-Scaled IDCT Architectures", Apr. 1, 2006, Montreux, Switzerland.
Sho Kikkawa, "Prospects of the Theory of Time-Frequency Analysis [IV]: Wavelets and Their Classification", The Journal of the Institute of Electronics,Information and Communication Engineers, Japan, The Institute of Electronics, Information and Communication Engineers, Aug. 1996, vol. 79, p. 820-830.

* cited by examiner

TRANSFORMS WITH COMMON FACTORS

CLAIM OF PRIORITY UNDER 35 U.S.C. §119

The present application claims priority to provisional U.S. Application Ser. No. 60/758,464, filed Jan. 11, 2006, entitled "Efficient Multiplication-Free Implementations of Scaled Discrete Cosine Transform (DCT) and Inverse Discrete Cosine Transform (IDCT)," assigned to the assignee hereof and incorporated herein by reference.

BACKGROUND

1. Field

The present disclosure relates generally to processing, and more specifically to techniques for performing transforms on data.

2. Background

Transforms are commonly used to convert data from one domain to another domain. For example, discrete cosine transform (DCT) is commonly used to transform data from spatial domain to frequency domain, and inverse discrete cosine transform (IDCT) is commonly used to transform data from frequency domain to spatial domain. DCT is widely used for image/video compression to spatially decorrelate blocks of picture elements (pixels) in images or video frames. The resulting transform coefficients are typically much less dependent on each other, which makes these coefficients more suitable for quantization and encoding. DCT also exhibits energy compaction property, which is the ability to map most of the energy of a block of pixels to only few (typically low order) transform coefficients. This energy compaction property can simplify the design of encoding algorithms.

Transforms such as DCT and IDCT may be performed on large quantity of data. Hence, it is desirable to perform transforms as efficiently as possible. Furthermore, it is desirable to perform computation for transforms using simple hardware in order to reduce cost and complexity.

There is therefore a need in the art for techniques to efficiently perform transforms on data.

SUMMARY

Techniques for efficiently performing transforms on data are described herein. According to an aspect, an apparatus performs multiplication of a first group of at least one data value with a first group of at least one rational dyadic constant that approximates a first group of at least one irrational constant scaled by a first common factor. The apparatus further performs multiplication of a second group of at least one data value with a second group of at least one rational dyadic constant that approximates a second group of at least one irrational constant scaled by a second common factor. Each rational dyadic constant is a rational number with a dyadic denominator. The first and second groups of at least one data value have different sizes. For example, the first group may include two data values, and the second group may include four data values.

According to another aspect, an apparatus performs multiplication of at least one data value with at least one rational dyadic constant that approximates at least one irrational constant scaled by a common factor. The common factor is selected based on the number of logical and arithmetic operations for the multiplication of the at least one data value with the at least one rational dyadic constant. The logical and arithmetic operations may comprise of shift, subtract, and add operations. The common factors may be selected further based on the precision of the results.

Various aspects and features of the disclosure are described in further detail below.

DETAILED DESCRIPTION

The techniques described herein may be used for various types of transforms such as DCT, IDCT, discrete Fourier transform (DFT), inverse DFT (IDFT), modulated lapped transform (MLT), inverse MLT, modulated complex lapped transform (MCLT), inverse MCLT, etc. The techniques may also be used for various applications such as image, video, and audio processing, communication, computing, data networking, data storage, graphics, etc. In general, the techniques may be used for any application that uses a transform. For clarity, the techniques are described below for DCT and IDCT, which are commonly used in image and video processing.

A one-dimensional (1D) N-point DCT and a 1D N-point IDCT of type II may be defined as follows:

$$X[k] = \frac{c(k)}{2} \cdot \sum_{n=0}^{N-1} x[n] \cdot \cos\frac{(2n+1) \cdot k\pi}{2N}, \text{ and} \quad \text{Eq (1)}$$

$$x[n] = \sum_{k=0}^{N-1} \frac{c(k)}{2} \cdot X[k] \cdot \cos\frac{(2n+1) \cdot k\pi}{2N}, \quad \text{Eq (2)}$$

$$\text{where } c(k) = \begin{cases} 1/\sqrt{2} & \text{if } k=0 \\ 1 & \text{otherwise,} \end{cases}$$

x[n] is a 1D spatial domain function, and
X[k] is a 1D frequency domain function.

The 1D DCT in equation (1) operates on N spatial domain values x[0] through x[N−1] and generates N transform coefficients X[0] through X[N−1]. The 1D IDCT in equation (2) operates on N transform coefficients and generates N spatial domain values. Type II DCT is one type of transform and is commonly believed to be one of the most efficient transforms among several energy compacting transforms proposed for image/video compression.

The 1D DCT may be used for a two 2D DCT, as described below. Similarly, the 1D IDCT may be used for a 2D IDCT. By decomposing the 2D DCT/IDCT into a cascade of 1D DCTs/IDCTs, the efficiency of the 2D DCT/IDCT is dependent on the efficiency of the 1D DCT/IDCT. In general, 1D DCT and 1D IDCT may be performed on any vector size, and 2D DCT and 2D IDCT may be performed on any block size. However, 8×8 DCT and 8×8 IDCT are commonly used for image and video processing, where N is equal to 8. For example, 8×8 DCT and 8×8 IDCT are used as standard building blocks in various image and video coding standards such as JPEG, MPEG-1, MPEG-2, MPEG-4 (P.2), H.261, H.263, etc.

The 1D DCT and 1D IDCT may be implemented in their original forms shown in equations (1) and (2), respectively. However, substantial reduction in computational complexity may be realized by finding factorizations that result in as few multiplications and additions as possible. A factorization for a transform may be represented by a flow graph that indicates specific operations to be performed for that transform.

Figure 1:
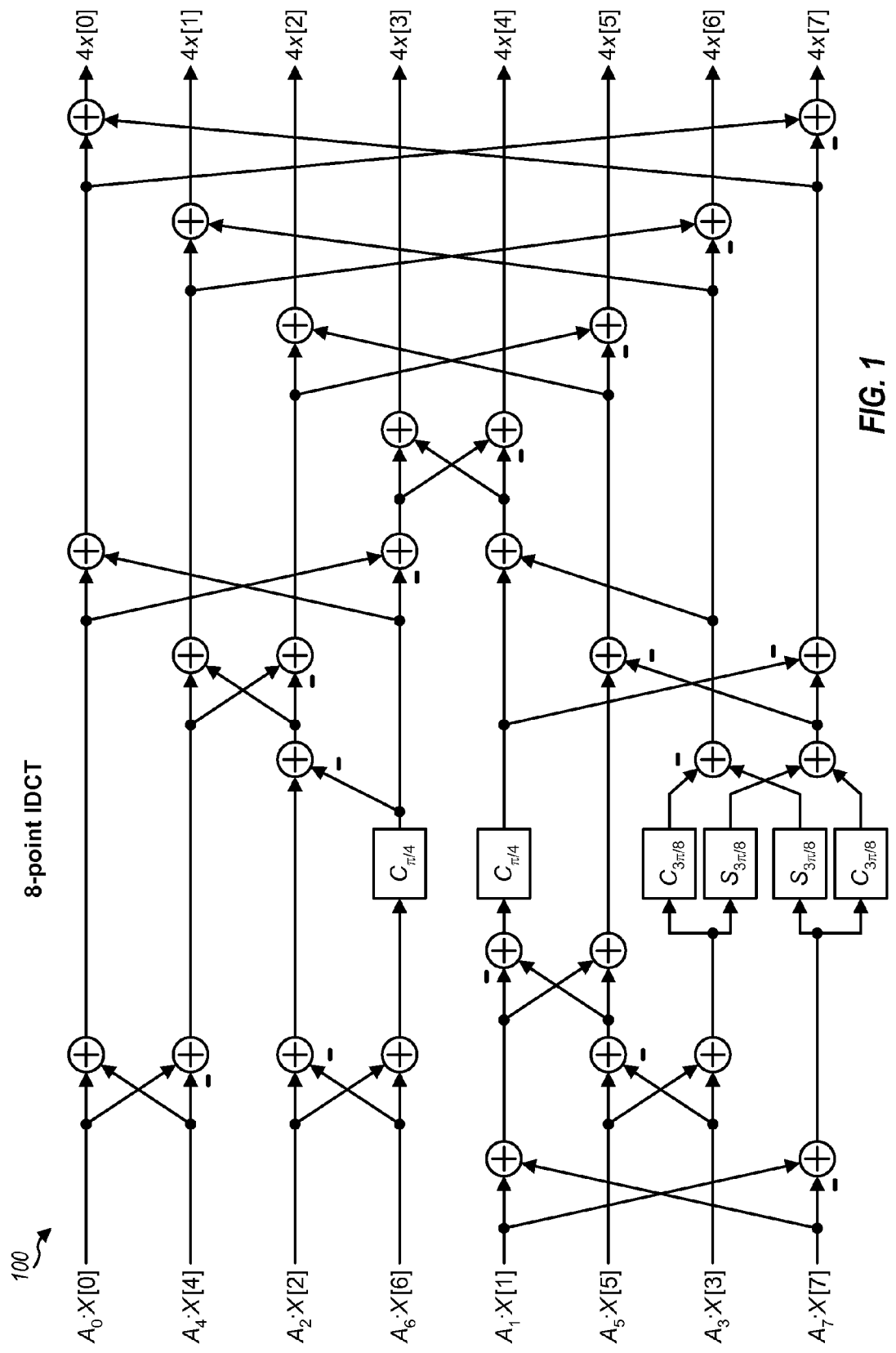
FIG. 1 shows a flow graph of an 8-point IDCT.

FIG. 1 shows a flow graph 100 of an example factorization of an 8-point IDCT. In flow graph 100, each addition is represented by symbol "⊕" and each multiplication is represented by a box. Each addition sums or subtracts two input values and provides an output value. Each multiplication multiplies an input value with a transform constant shown inside the box and provides an output value. The factorization in FIG. 1 has six multiplications with the following constant factors:

$$C_{\pi/4} = \cos(\pi/4) \approx 0.707106781,$$

$$C_{3\pi/8} = \cos(3\pi/8) \approx 0.382683432, \text{ and}$$

$$S_{3\pi/8} = \sin(3\pi/8) \approx 0.923879533.$$

Flow graph 100 receives eight scaled transform coefficients $A_0 \cdot X[0]$ through $A_7 \cdot X[7]$, performs an 8-point IDCT on these coefficients, and generates eight output samples $x[0]$ through $x[7]$. $A_0$ through $A_7$ are scale factors and are given below:

$$A_0 = \frac{1}{2\sqrt{2}} \approx 0.3535533906,$$

$$A_1 = \frac{\cos(7\pi/16)}{2\sin(3\pi/8) - \sqrt{2}} \approx 0.4499881115,$$

$$A_2 = \frac{\cos(\pi/8)}{\sqrt{2}} \approx 0.6532814824,$$

$$A_3 = \frac{\cos(5\pi/16)}{\sqrt{2} + 2\cos(3\pi/8)} \approx 0.2548977895,$$

$$A_4 = \frac{1}{2\sqrt{2}} \approx 0.3535533906,$$

$$A_5 = \frac{\cos(3\pi/16)}{\sqrt{2} - 2\cos(3\pi/8)} \approx 1.2814577239,$$

$$A_6 = \frac{\cos(3\pi/8)}{\sqrt{2}} \approx 0.2705980501,$$

$$A_7 = \frac{\cos(\pi/16)}{\sqrt{2} + 2\sin(3\pi/8)} \approx 0.3006724435.$$

Flow graph 100 includes a number of butterfly operations. A butterfly operation receives two input values and generates two output values, where one output value is the sum of the two input values and the other output value is the difference of the two input values. For example, the butterfly operation on input values $A_0 \cdot X[0]$ and $A_4 \cdot X[4]$ generates an output value $A_0 \cdot X[0] + A_4 \cdot X[4]$ for the top branch and an output value $A_0 \cdot X[0] - A_4 \cdot X[4]$ for the bottom branch.

Figure 2:
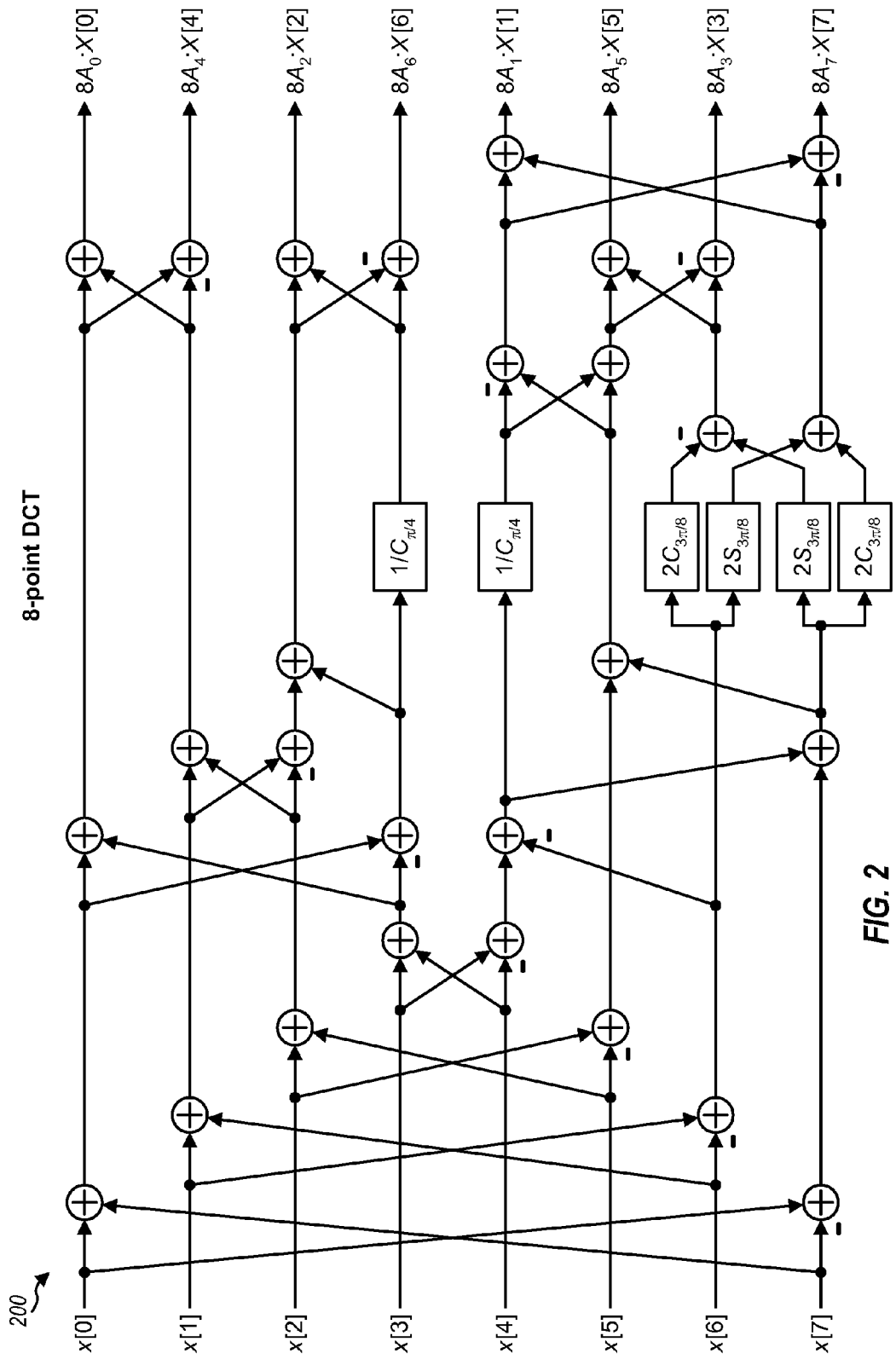
FIG. 2 shows a flow graph of an 8-point DCT.

FIG. 2 shows a flow graph 200 of an example factorization of an 8-point DCT. Flow graph 200 receives eight input samples $x[0]$ through $x[7]$, performs an 8-point DCT on these input samples, and generates eight scaled transform coefficients $8A_0 \cdot X[0]$ through $8A_7 \cdot X[7]$. The scale factors $A_0$ through $A_7$ are given above. The factorization in FIG. 2 has six multiplications with constant factors $1/C_{\pi/4}$, $2C_{3\pi/8}$ and $2S_{3\pi/8}$.

The flow graphs for the IDCT and DCT in FIGS. 1 and 2 are similar and involve multiplications by essentially the same constant factors (with the difference in ½). Such similarity may be advantageous for implementation of the DCT and IDCT on an integrated circuit. In particular, the similarity may enable savings of silicon or die area to implement the butterflies and the multiplications by transform constants, which are used in both the forward and inverse transforms.

The factorization shown in FIG. 1 results in a total of 6 multiplications and 28 additions, which are substantially fewer than the number of multiplications and additions required for direct computation of equation (2). The factorization shown in FIG. 2 also results in a total of 6 multiplications and 28 additions, which are substantially fewer than the number of multiplications and additions required for direct computation of equation (1). The factorization in FIG. 1 performs plane rotation on two intermediate variables with $C_{3\pi/8}$ and $S_{3\pi/8}$. The factorization in FIG. 2 performs plane rotation on two intermediate variables with $2C_{3\pi/8}$ and $2S_{3\pi/8}$. A plane rotation is achieved by multiplying an intermediate variable with both sine and cosine, e.g., cos $(3\pi/8)$ and sin $(3\pi/8)$ in FIG. 1. The multiplications for plane rotation may be efficiently performed using the computation techniques described below.

FIGS. 1 and 2 show example factorizations of an 8-point IDCT and an 8-point DCT, respectively. These factorizations are for scaled IDCT and scaled DCT, where "scaled" refers to the scaling of the transform coefficients $X[0]$ through $X[7]$ with known scale factors $A_0$ through $A_7$, respectively. Other factorizations have also been derived by using mappings to other known fast algorithms such as a Cooley-Tukey DFT algorithm or by applying systematic factorization procedures such as decimation in time or decimation in frequency. In general, factorization reduces the number of multiplications but does not eliminate them.

The multiplications in FIGS. 1 and 2 are with irrational constants representing the sine and cosine of different angles, which are multiples of $\pi/8$ for the 8-point DCT and IDCT. An irrational constant is a constant that is not a ratio of two integers. The multiplications with irrational constants may be more efficiently performed in fixed-point integer arithmetic when each irrational constant is approximated by a rational dyadic constant. A rational dyadic constant is a rational constant with a dyadic denominator and has the form $c/2^b$, where b and c are integers and b>0. Multiplication of an integer variable with a rational dyadic constant may be achieved with logical and arithmetic operations, as described below. The number of logical and arithmetic operations is dependent on the manner in which the computation is performed as well as the value of the rational dyadic constant.

In an aspect, common factors are used to reduce the total number of operations for a transform and/or to improve the precision of the transform results. A common factor is a constant that is applied to one or more intermediate variables in a transform. An intermediate variable may also be referred to as a data value, etc. A common factor may be absorbed with one or more transform constants and may also be accounted for by altering one or more scale factors. A common factor may improve the approximation of one or more (irrational) transform constants by one or more rational dyadic constants, which may then result in a fewer total number of operations and/or improved precision.

In general, any number of common factors may be used for a transform, and each common factor may be applied to any number of intermediate variables in the transform. In one design, multiple common factors are used for a transform and are applied to multiple groups of intermediate variables of different sizes. In another design, multiple common factors are applied to multiple groups of intermediate variables of the same size.

Figure 3:
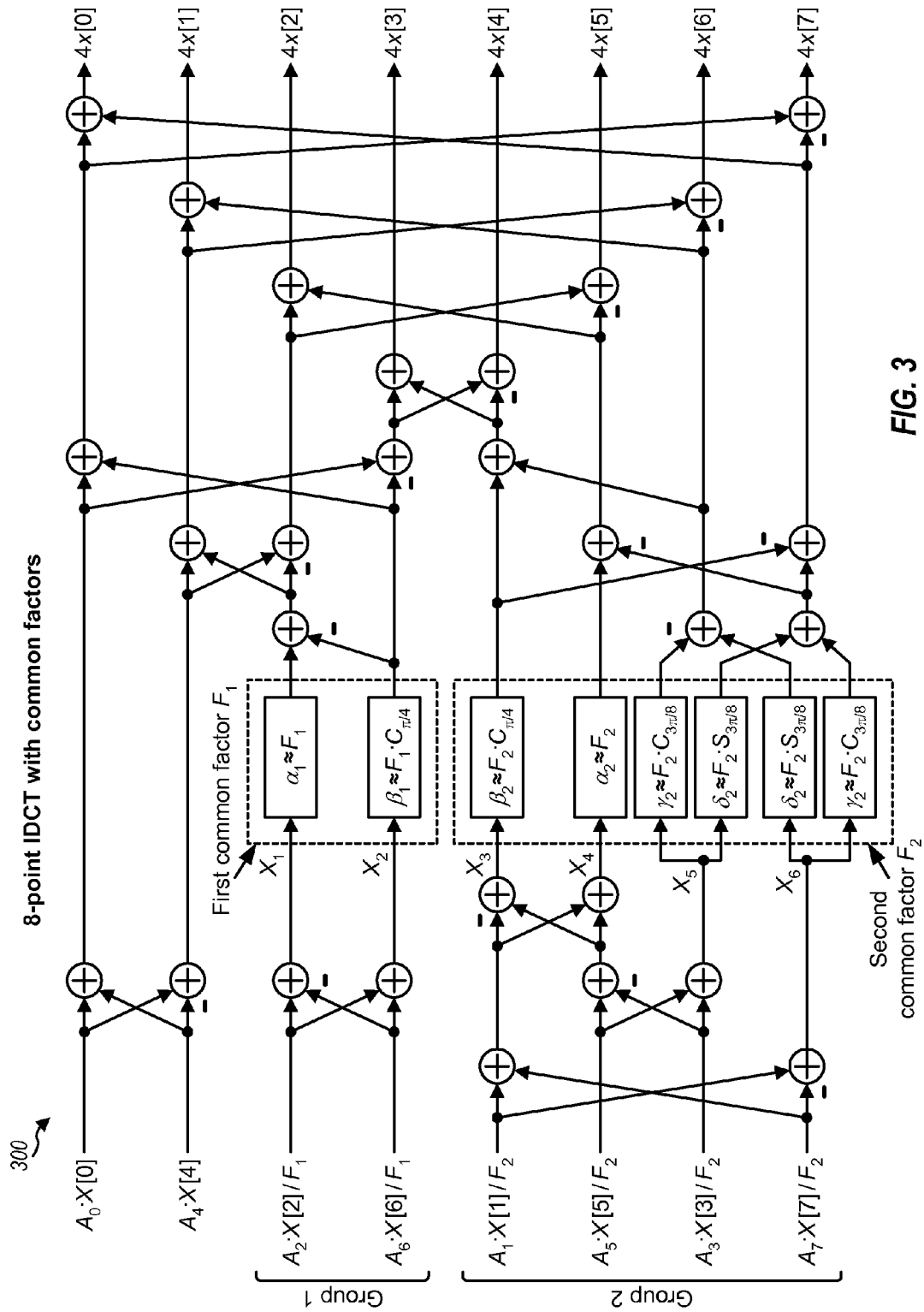
FIG. 3 shows a flow graph of an 8-point IDCT with common factors.

FIG. 3 shows a flow graph 300 of an 8-point IDCT with common factors. Flow graph 300 uses the same factorization as flow graph 100 in FIG. 1. However, flow graph 300 uses two common factors for two groups of intermediate variables.

A first common factor $F_1$ is applied to a first group of two intermediate variables $X_1$ and $X_2$, which is generated based on transform coefficients X[2] and X[6]. The first common factor $F_1$ is multiplied with $X_1$, is absorbed with transform constant $C_{\pi/4}$, and is accounted for by altering scale factors $A_2$ and $A_6$. A second common factor $F_2$ is applied to a second group of four intermediate variables $X_3$ through $X_6$, which is generated based on transform coefficients X[1], X[3], X[5] and X[7]. The second common factor $F_2$ is multiplied with $X_4$, is absorbed with transform constants $C_{\pi/4}$, $C_{3\pi/8}$ and $S_{3\pi/8}$, and is accounted for by altering scale factors $A_1$, $A_3$, $A_5$ and $A_7$.

The first common factor $F_1$ may be approximated with a rational dyadic constant $\alpha_1$, which may be multiplied with $X_1$ to obtain an approximation of the product $X_1 \cdot F_1$. A scaled transform factor $F_1 \cdot C\pi/4$ may be approximated with a rational dyadic constant $\beta_1$, which may be multiplied with $X_2$ to obtain an approximation of the product $X_2 \cdot F_1 \cdot C_{\pi/4}$. An altered scale factor $A_2/F_1$ may be applied to transform coefficient X[2]. An altered scale factor $A_6/F_1$, may be applied to transform coefficient X[6].

The second common factor $F_2$ may be approximated with a rational dyadic constant $\alpha_2$, which may be multiplied with $X_4$ to obtain an approximation of the product $X_4 \cdot F_2$. A scaled transform factor $F_2 \cdot C_{\pi/4}$ may be approximated with a rational dyadic constant $\beta_2$, which may be multiplied with $X_3$ to obtain an approximation of the product $X_3 \cdot F_2 \cdot C_{\pi/4}$. A scaled transform factor $F_2 \cdot C_{3\pi/8}$ may be approximated with a rational dyadic constant $\gamma_2$, and a scaled transform factor $F_2 \cdot S_{3\pi/8}$ may be approximated with a rational dyadic constant $\delta_2$. Rational dyadic constant $\gamma_2$ may be multiplied with $X_5$ to obtain an approximation of the product $X_5 \cdot F_2 \cdot C_{3\pi/8}$ and also with $X_6$ to obtain an approximation of the product $X_6 \cdot F_2 \cdot C_{3\pi/8}$. Rational dyadic constant $\delta_2$ may be multiplied with $X_5$ to obtain an approximation of the product $X_5 \cdot F_2 \cdot S_{3\pi/8}$ and also with $X_6$ to obtain an approximation of the product $X_6 \cdot F_2 \cdot S_{3\pi/8}$. Altered scale factors $A_1/F_2$, $A_3/F_2$, $A_5/F_2$ and $A_7/F_2$ may be applied to transform coefficients X[1], X[3], X[5] and X[7], respectively.

Six rational dyadic constants $\alpha_1$, $\beta_1$, $\alpha_2$, $\beta_2$, $\gamma_2$ and $\delta_2$ may be defined for six constants, as follows:

$$\alpha_1 \approx F_1, \beta_1 \approx F_1 \cdot \cos(\pi/4),$$

$$\alpha_2 \approx F_2, \beta_2 \approx F_2 \cdot \cos(\pi/4), \gamma_2 \approx F_2 \cdot \cos(3\pi/8), \text{ and}$$
$$\delta_2 \approx F_2 \cdot \sin(3\pi/8). \quad \text{Eq (3)}$$

Figure 4:
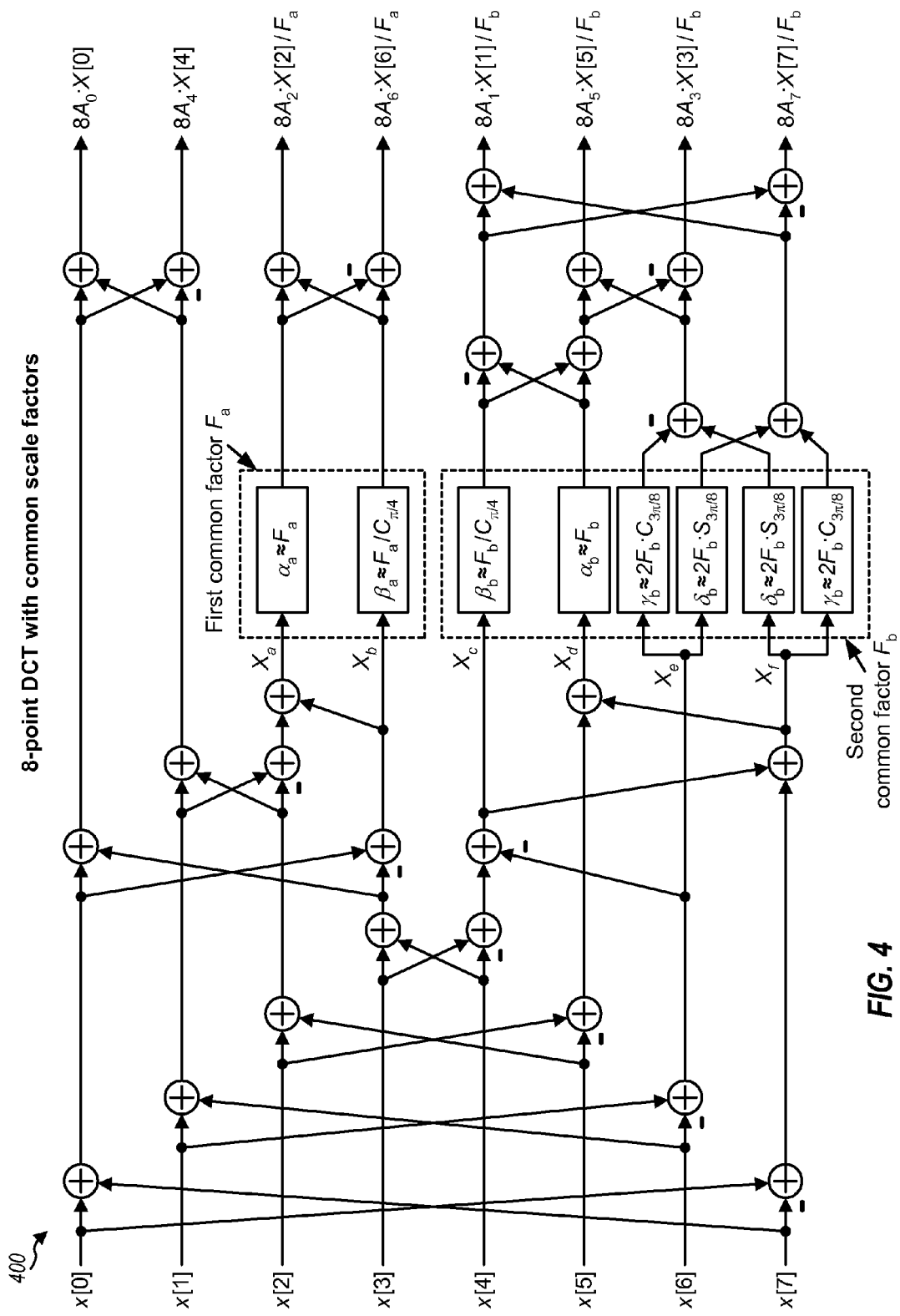
FIG. 4 shows a flow graph of an 8-point DCT with common factors.

FIG. 4 shows a flow graph 400 of an 8-point DCT with common factors. Flow graph 400 uses the same factorization as flow graph 200 in FIG. 2. However, flow graph 400 uses two common factors for two groups of intermediate variables.

A first common factor $F_a$ is applied to a first group of two intermediate variables $X_a$ and $X_b$, which is used to generate transform coefficients X[2] and X[6]. The first common factor $F_a$ is multiplied with $X_a$, is absorbed with transform constant $1/C_{\pi/4}$, and is accounted for by altering scale factors $A_2$ and $A_6$. A second common factor $F_b$ is applied to a second group of four intermediate variables $X_c$ through $X_f$, which is used to generate transform coefficients X[1], X[3], X[5] and X[7]. The second common factor $F_b$ is multiplied with $X_d$, is absorbed with transform constants $1/C_{\pi/4}$, $2C_{3\pi/8}$ and $2S_{3\pi/8}$, and is accounted for by altering scale factors $A_1$, $A_3$, $A_5$ and $A_7$.

The first common factor $F_a$ may be approximated with a rational dyadic constant $\alpha_a$, which may be multiplied with $X_a$ to obtain an approximation of the product $X_a \cdot F_a$. A scaled transform factor $f_a/C_{\pi/4}$ may be approximated with a rational dyadic constant $\beta_a$, which may be multiplied with $X_b$ to obtain an approximation of the product $X_b \cdot F_a/C_{\pi/4}$. Altered scale factors $A_2/F_a$ and $A_6/F_a$ may be applied to transform coefficients X[2] and X[6], respectively.

The second common factor $F_b$ may be approximated with a rational dyadic constant $\alpha_b$, which may be multiplied with $X_d$ to obtain an approximation of the product $X_d \cdot F_b$. A scaled transform factor $F_b/C_{\pi/4}$ may be approximated with a rational dyadic constant $\beta_b$, which may be multiplied with $X_c$ to obtain an approximation of the product $X_c \cdot F_b/C_{\pi/4}$. A scaled transform factor $2F_b \cdot C_{3\pi/8}$ may be approximated with a rational dyadic constant $\gamma_b$, and a scaled transform factor $2F_b \cdot S_{3\pi/8}$ may be approximated with a rational dyadic constant $\delta_b$. Rational dyadic constant $\gamma_b$ may be multiplied with $X_e$ to obtain an approximation of the product $2X_e \cdot F_b \cdot C_{3\pi/8}$ and also with $X_f$ to obtain an approximation of the product $2X_f \cdot F_b \cdot C_{3\pi/8}$. Rational dyadic constant $\delta_b$ may be multiplied with $X_e$ to obtain an approximation of the product $2X_e \cdot F_b \cdot S_{3\pi/8}$ and also with $X_f$ to obtain an approximation of the product $2X_f \cdot F_b \cdot S_{3\pi/8}$. Altered scale factors $A_1/F_b$, $A_3/F_b$, $A_5/F_b$ and $A_7/F_b$ may be applied to transform coefficients X[1], X[3], X[5] and X[7], respectively.

Six rational dyadic constants $\alpha_a$, $\beta_a$, $\alpha_b$, $\beta_b$, $\gamma_b$ and $\delta_b$ may be defined for six constants, as follows:

$$\alpha_a \approx F_a, \beta_a \approx F_a/\cos(\pi/4),$$

$$\alpha_b \approx F_b, \beta_b \approx F_b/\cos(\pi/4), \gamma_b \approx 2F_b \cdot \cos(3\pi/8), \text{ and}$$
$$\delta_b \approx 2F_b \cdot \sin(3\pi/8). \quad \text{Eq (4)}$$

FIGS. 3 and 4 show example use of common factors for specific factorizations of 8-point IDCT and 8-point DCT, respectively. Common factors may be used for other factorizations of the DCT and IDCT and also for other types of transforms. In general, a common factor may be applied to a group of at least one intermediate variable in a transform. This group of intermediate variable(s) may be generated from a group of input values (e.g., as shown in FIG. 3) or used to generate a group of output values (e.g., as shown in FIG. 4). The common factor may be accounted for by the scale factors applied to the input values or the output values.

Multiple common factors may be applied to multiple groups of intermediate variables, and each group may include any number of intermediate variables. The selection of the groups may be dependent on various factors such as the factorization of the transform, where the transform constants are located within the transform, etc. Multiple common factors may be applied to multiple groups of intermediate variables of the same size (not shown in FIGS. 3 and 4) or different sizes (as shown in FIGS. 3 and 4). For example, three common factors may be used for the factorization shown in FIG. 3, with a first common factor being applied to intermediate variables $X_1$ and $X_2$, a second common factor being applied to intermediate variables $X_3$, $X_4$, $X_5$ and $X_6$, and a third common factor being applied to two intermediate variables generated from X[0] and X[4].

Multiplication of an intermediate variable x with a rational dyadic constant u may be performed in various manners in fixed-point integer arithmetic. The multiplication may be performed using logical operations (e.g., left shift, right shift, bit-inversion, etc.), arithmetic operations (e.g., add, subtract, sign-inversion, etc.) and/or other operations. The number of logical and arithmetic operations needed for the multiplication of x with u is dependent on the manner in which the computation is performed and the value of the rational dyadic constant u. Different computation techniques may require different numbers of logical and arithmetic operations for the same multiplication of x with u. A given computation technique may require different numbers of logical and arithmetic operations for the multiplication of x with different values of u.

A common factor may be selected for a group of intermediate variables based on criteria such as:
- The number of logical and arithmetic operations to perform multiplication, and
- The precision of the results.

In general, it is desirable to minimize the number of logical and arithmetic operations for multiplication of an intermediate variable with a rational dyadic constant. On some hardware platforms, arithmetic operations (e.g., additions) may be more complex than logical operations, so reducing the number of arithmetic operations may be more important. In the extreme, computational complexity may be quantified based solely on the number of arithmetic operations, without taking into account logical operations. On some other hardware platforms, logical operations (e.g., shifts) may be more expensive, and reducing the number of logical operations (e.g., reducing the number of shift operations and/or the total number of bits shifted) may be more important. In general, a weighted average number of logical and arithmetic operations may be used, where the weights may represent the relative complexities of the logical and arithmetic operations.

The precision of the results may be quantified based on various metrics such as those given in Table 6 below. In general, it is desirable to reduce the number of logical and arithmetic operations (or computational complexity) for a given precision. It may also be desirable to trade off complexity for precision, e.g., to achieve higher precision at the expense of some additional operations.

As shown in FIGS. 3 and 4, for each common factor, multiplication may be performed on a group of intermediate variables with a group of rational dyadic constants that approximates a group of at least one irrational constant (for at least one transform factor) scaled by that common factor. Multiplication in fixed-point integer arithmetic may be performed in various manners. For clarity, computation techniques that perform multiplication with shift and add operations and using intermediate results are described below. These computation techniques may reduce the total number of shift and add operations for the DCT and IDCT.

Multiplication of an integer variable x with an irrational constant μ in fixed-point integer arithmetic may be achieved by approximating the irrational constant with a rational dyadic constant, as follows:

$$\mu \approx c/2^b, \qquad \text{Eq (5)}$$

where μ is the irrational constant to be approximated, $c/2^b$ is the rational dyadic constant, b and c are integers, and b>0.

Given integer variable x and rational dyadic constant $u=c/2^b$, an integer-valued product $$y=(x \cdot c)/2^b \qquad \text{Eq (6)}$$

may be approximated using a series of intermediate values $$y_0, y_1, y_2, \ldots, y_t, \qquad \text{Eq (7)}$$

where $y_0=0$, $y_1=x$, and for all $2 \leq i \leq t$ values, $y_i$ is obtained as follows:

$$y_i = \pm y_j \pm y_k \cdot 2^{s_i}, \text{ with } j,k<i, \qquad \text{Eq (8)}$$

where $y_k \cdot 2^{s_i}$ implies either left or right shift (depending on the sign of constant $s_i$) of intermediate value $y_k$ by $|s_i|$ bits.

In equation (8), $y_i$ may be equal to $y_j+y_k \cdot 2^{s_i}$, $y_j-y_k \cdot 2^{s_i}$, or $-y_j+y_k \cdot 2^{s_i}$. Each intermediate value $y_i$ in the series may be derived based on two prior intermediate values $y_j$ and $y_k$ in the series, where either $y_j$ or $y_k$ may be equal to zero. Each intermediate value $y_i$ may be obtained with one shift and/or one addition. The shift is not needed if $s_i$ is equal to zero. The addition is not needed if $y_j=y_0=0$. The total number of additions and shifts for the multiplication is determined by the number of intermediate values in the series, which is t, as well as the expression used for each intermediate value. The multiplication by rational dyadic constant u is essentially unrolled into a series of shift and add operations. The series is defined such that the final value in the series becomes the desired integer-valued product, or $$y_t \approx y. \qquad \text{Eq (9)}$$

As shown in equations (5) through (9), the multiplication of integer variable x with irrational constant μ may be approximated with a series of intermediate values generated by shift and add operations and using intermediate results (or prior generated intermediate values) to reduce the total number of operations.

Multiplication of an integer variable x with two irrational constants μ and η in fixed-point integer arithmetic may be achieved by approximating the irrational constants with rational dyadic constants, as follows:

$$\mu \approx c/2^b \text{ and } \eta \approx e/2^d, \qquad \text{Eq (10)}$$

where $c/2^b$ and $e/2^d$ are two rational dyadic constants, b, c, d and e are integers, b>0 and d>0.

Given integer variable x and rational dyadic constants $u=c/2^b$ and $v=e/2^d$, two integer-valued products $$y=(x \cdot c)/2^b \text{ and } z=(x \cdot e)/2^d \qquad \text{Eq (11)}$$

may be approximated using a series of intermediate values $$w_0, w_1, w_2, \ldots, w_t, \qquad \text{Eq (12)}$$

where $w_0=0$, $w_1=x$, and for all $2 \leq i \leq t$ values, $w_i$ is obtained as follows:

$$w_i = \pm w_j \pm w_k \cdot 2^{s_i}, \text{ with } j,k<i, \qquad \text{Eq (13)}$$

where $w_k \cdot 2^{s_i}$, implies either left or right shift of $w_k$ by $|s_i|$ bits. The series is defined such that the desired integer-valued products are obtained at steps m and n, as follows:

$$w_m \approx y \text{ and } w_n \approx z, \qquad \text{Eq (14)}$$

where $m,n \leq t$ and either m or n is equal to t.

As shown in equations (10) through (14), the multiplication of integer variable x with irrational constants μ and η may be approximated with a common series of intermediate values generated by shift and add operations and using intermediate results to reduce the total number of operations.

In the computation described above, trivial operations such as additions and subtractions of zeros and shifts by zero bits may be omitted. The following simplifications may be made:

$$y_i = \pm y_0 \pm y_k \cdot 2^{s_i} \Rightarrow y_i = \pm y_k \cdot 2^{s_i}, \qquad \text{Eq (15)}$$

$$y_i = \pm y_j \pm y_k \cdot 2^0 \Rightarrow y_i = \pm y_j \pm y_k. \qquad \text{Eq (16)}$$

In equation (15), the expression to the left of "⇒" involves an addition or subtraction of zero (denoted by $y_0$) and may be performed with one shift, as shown by the expression to the right of "⇒". In equation (16), the expression to the left of "⇒" involves a shift by zero bits (denoted by $2^0$) and may be performed with one addition, as shown by the expression to the right of "⇒". Equations (15) and (16) may be applied to equation (8) in the computation of $y_i$ as well as to equation (13) in the computation of $w_i$.

The multiplications in FIGS. 1 through 4 may be efficiently performed using the computation techniques described above. In FIG. 1, multiplication of integer variable x with transform constant $C_{\pi/4}$ in fixed-point integer arithmetic may be achieved by approximating constant $C_{\pi/4}$ with a rational dyadic constant, as follows:

$$C_{\pi/4}^8 = \frac{181}{256} = \frac{b010110101}{b100000000}, \qquad \text{Eq (17)}$$

where $C_{\pi/4}^8$ is a rational dyadic constant that is an 8-bit approximation of $C_{\pi/4}$.

Multiplication of integer variable x by constant $C_{\pi/4}^8$ may be expressed as:

$$y=(x\cdot 181)/256. \qquad \text{Eq (18)}$$

The multiplication in equation (18) may be achieved with the following series of operations:

$y_1=x$, //1

$y_2=y_1+(y_1\!>\!>2)$, //101

$y_3=y_1-(y_2\!>\!>2)$, //01011

$y_4=y_3+(y_2\!>\!>6)$, //010110101. Eq (19)

The binary value to the right of "//" is an intermediate constant that is multiplied with variable x.

The desired product is equal to $y_4$, or $y_4=y$. The multiplication in equation (18) may be performed with three additions and three shifts to generate three intermediate values $y_2$, $Y_3$ and $Y_4$.

In FIG. 1, multiplication of integer variable x with transform constants $C_{3\pi/8}$ and $S_{3\pi/8}$ in fixed-point integer arithmetic may be achieved by approximating constants $C_{3\pi/8}$ and $S_{3\pi/8}$ with rational dyadic constants, as follows:

$$C_{3\pi/8}^7 = \frac{49}{128} = \frac{b00110001}{b10000000}, \text{ and} \qquad \text{Eq (20)}$$

$$S_{3\pi/8}^9 = \frac{473}{512} = \frac{b0111011001}{b1000000000}, \qquad \text{Eq (21)}$$

where $C_{3\pi/8}^7$ is a rational dyadic constant that is a 7-bit approximation of $C_{3\pi/8}$, and $S_{3\pi/8}^9$ is a rational dyadic constant that is a 9-bit approximation of $S_{3\pi/8}$.

Multiplication of integer variable x by constants $C_{3\pi/8}^7$ and $C_{3\pi/8}^9$ may be expressed as:

$$y=(x\cdot 49)/128 \text{ and } z=(x\cdot 473)/512. \qquad \text{Eq (22)}$$

The multiplications in equation (22) may be achieved with the following series of operations:

$w_1=x$, //1

$w_2=w_1-(w_1\!>\!>2)$, //011

$w_3=w_1\!>\!>6$, //0000001

$w_4=w_2+w_3$, //0110001

$w_5=w_1-w_3$, //0111111

$w_6=w_4\!>\!>1$, //00110001

$w_7=w_5-(w_1\!>\!>4)$, //0111011

$w_8=w_7+(w_1\!>\!>9)$, //0111011001. Eq (23)

The desired products are equal to $w_6$ and $w_8$, or $w_6=y$ and $w_8=z$. The two multiplications in equation (22) may be jointly performed with five additions and five shifts to generate seven intermediate values $w_2$ through $w_8$. Additions of zeros are omitted in the generation of $w_3$ and $w_6$. Shifts by zero are omitted in the generation of $w_4$ and $w_5$.

For the 8-point IDCT shown in FIG. 1, using the computation techniques described above for multiplications by constants $C_{\pi/4}^8$, $C_{\pi/8}^7$ and $S_{\pi/8}^9$, the total complexity for 8-bit precision may be given as: 28+3·2+5·2=44 additions and 3·2+5·2=16 shifts. In general, any desired precision may be achieved by using sufficient number of bits for the approximation of each transform constant.

For the 8-point DCT shown in FIG. 2, irrational constants $1/C_{\pi/4}$, $C_{3\pi/8}$ and $S_{3\pi/8}$ may be approximated with rational dyadic constants. Multiplications with the rational dyadic constants may be achieved using the computation techniques described above.

For the IDCT shown in FIG. 3, different values of common factors $F_1$ and $F_2$ may result in different total numbers of logical and arithmetic operations for the IDCT and different levels of precision for the output samples x[0] through x[7]. Different combinations of values for $F_1$ and $F_2$ may be evaluated. For each combination of values, the total number of logical and arithmetic operations for the IDCT and the precision of the output samples may be determined.

For a given value of $F_1$, rational dyadic constants $\alpha_1$ and $\beta_1$ may be obtained for $F_1$ and $F_1 \cdot C_{\pi/4}$, respectively. The numbers of logical and arithmetic operations may then be determined for multiplication of $X_1$ with $\alpha_1$ and multiplication of $X_2$ with $\beta_1$. For a given value of $F_2$, rational dyadic constants $\alpha_2$, $\beta_2$, $\gamma_2$ and $\delta_2$ may be obtained for $F_2$, $F_2 \cdot C_{\pi/4}$, $F_2 \cdot C_{3\pi/8}$ and $F_2 \cdot S_{3\pi/8}$ respectively. The numbers of logical and arithmetic operations may then be determined for multiplication of $X_4$ with $\alpha_2$, multiplication of $X_3$ with $\beta_2$, and multiplications of $X_5$ with both $\gamma_2$ and $\delta_2$. The number of operations for multiplications of $X_6$ with $\gamma_2$ and $\delta_2$ is equal to the number of operations for multiplications of $X_5$ with $\gamma_2$ and $\delta_2$.

To facilitate the evaluation and selection of the common factors, the number of logical and arithmetic operations may be pre-computed for multiplication with different possible values of rational dyadic constants. The pre-computed numbers of logical and arithmetic operations may be stored in a look-up table or some other data structure.

Figure 5:
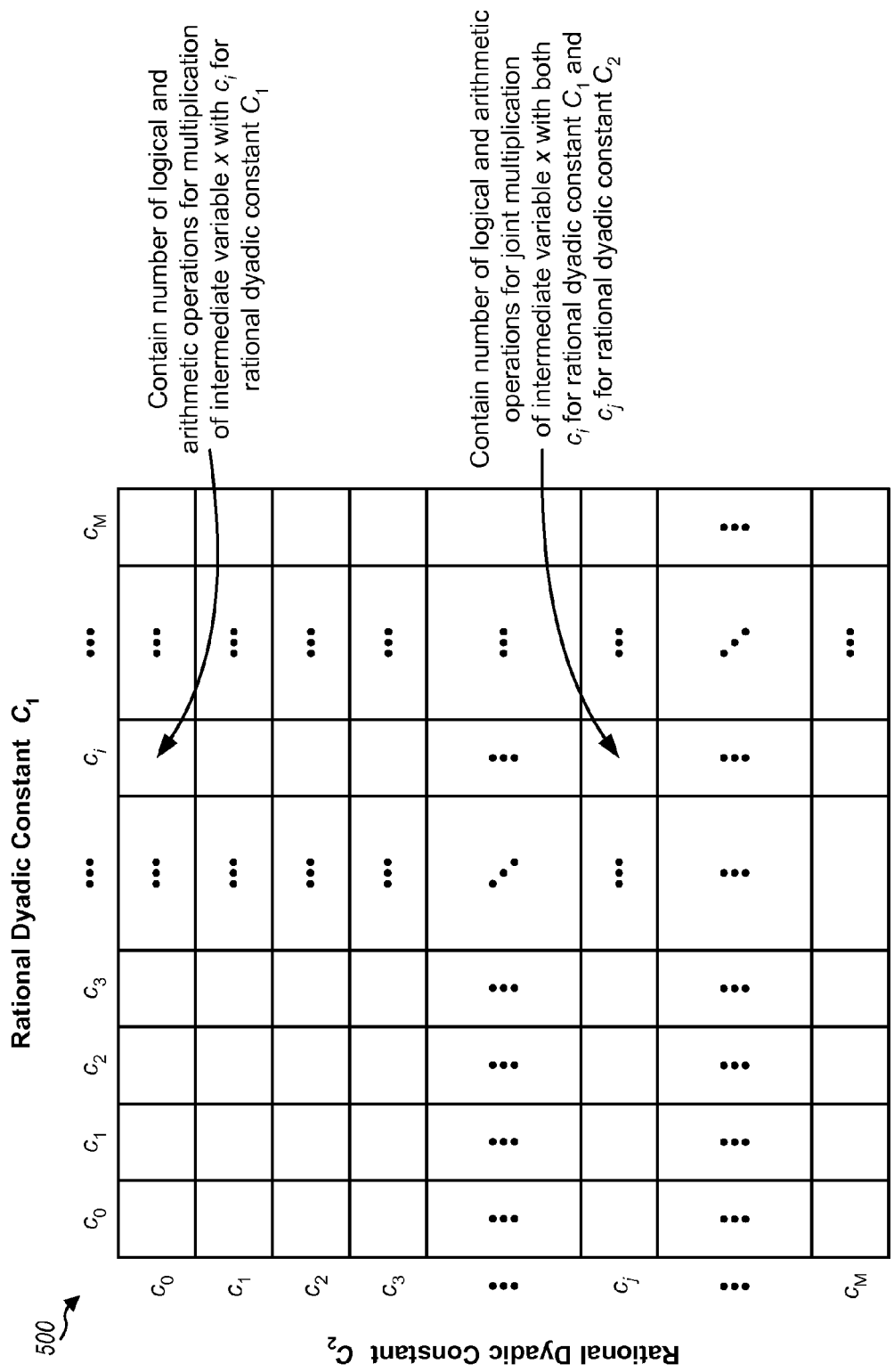
FIG. 5 shows a look-up table storing the numbers of operations for multiplication with different rational dyadic constant values.

FIG. 5 shows a look-up table 500 that stores the numbers of logical and arithmetic operations for multiplication with different rational dyadic constant values. Look-up table 500 is a two-dimensional table with different possible values of a first rational dyadic constant $C_1$ on the horizontal axis and different possible values of a second rational dyadic constant $C_2$ on the vertical axis. The number of possible values for each rational dyadic constant is dependent on the number of bits used for that constant. For example, if $C_1$ is represented with 13 bits, then there are 8192 possible values for $C_1$. The possible values for each rational dyadic constant are denoted as $c_0, c_1, c_2, \ldots, c_M$, where $c_0=0$, $c_1$ is the smallest non-zero value, and $c_M$ is the maximum value (e.g., $c_M=8191$ for 13-bit).

The entry in the i-th column and j-th row of look-up table 500 contains the number of logical and arithmetic operations for joint multiplication of intermediate variable x with both $c_i$ for the first rational dyadic constant $C_1$ and $C_j$ for the second rational dyadic constant $C_2$. The value for each entry in look-up table 500 may be determined by evaluating different possible series of intermediate values for the joint multiplication with $c_i$ and $c_j$ for that entry and selecting the best series, e.g., the series with the fewest operations. The entries in the first row of look-up table 500 (with $c_0=0$ for the second rational dyadic constant $C_2$) contain the numbers of operations for multiplication of intermediate variable x with just $c_i$ for the first rational dyadic constant $C_1$. Since the look-up table is symmetrical, entries in only half of the table (e.g., either above or below the main diagonal) may be filled. Furthermore, the number of entries to fill may be reduced by considering the irrational constants being approximated with the rational dyadic constants $C_1$ and $C_2$.

For a given value of $F_1$, rational dyadic constants $\alpha_1$ and $\beta_1$ may be determined. The numbers of logical and arithmetic operations for multiplication of $X_1$ with $\alpha_1$ and multiplication of $X_2$ with $\beta_1$ may be readily determined from the entries in the first row of look-up table 500, where $\alpha_1$ and $\beta_1$ correspond to $C_1$. Similarly, for a given value of $F_2$, rational dyadic constants $\alpha_2$, $\beta_2$, $\gamma_2$ and $\delta_2$ may be determined. The numbers of logical and arithmetic operations for multiplication of $X_4$ with $\alpha_2$ and multiplication of $X_3$ with $\beta_2$ may be determined from the entries in the first row of look-up table 500, where $\alpha_2$ and $\beta_2$ correspond to $C_1$. The number of logical and arithmetic operations for joint multiplication of $X_5$ with $\gamma_2$ and $\delta_2$ may be determined from an appropriate entry in look-up table 500, where $\gamma_2$ may correspond to $C_1$ and $\delta_2$ may correspond to $C_2$, or vice versa.

For each possible combination of values for $F_1$ and $F_2$, the precision metrics in Table 6 may be determined for a sufficient number of iterations with different random input data.

The values of $F_1$ and $F_2$ that result in poor precision (e.g., failure of the metrics) may be discarded, and the values of $F_1$ and $F_2$ that result in good precision (e.g., pass of the metrics) may be retained.

Tables 1 through 5 show five fixed-point approximations for the IDCT in FIG. 3, which are denoted as algorithms A, B, C, D and E. These approximations are for two groups of factors, with one group including $\alpha_1$ and $\beta_1$ and another group including $\alpha_2$, $\beta_2$, $\gamma_2$ and $\delta_2$. For each of Tables 1 through 5, the common factor for each group is given in the first column. The common factors improve the precision of the rational dyadic constant approximations and may be merged with the appropriate scale factors in the flow graph for the IDCT. The original values (which may be 1 or irrational constants) are given in the third column. The rational dyadic constant for each original value scaled by its common factor is given in the fourth column. The series of intermediate values for the multiplication of intermediate variable x with one or two rational dyadic constants is given in the fifth column. The numbers of add and shift operations for each multiplication are given in the sixth and seventh columns, respectively. The total number of add operations for the IDCT is equal to the sum of all add operations in the sixth column plus the last entry again (to account for multiplication of each of $X_5$ and $X_6$ with both $\gamma_2$ and $\delta_2$) plus 28 add operations for all of the butterflies in the flow graph. The total number of shift operations for the IDCT is equal to the sum of all shift operations in the last column plus the last entry again.

Table 1 gives the details of algorithm A, which uses a common factor of 1/1.0000442471 for each of the two groups.

TABLE 1

Approximation A (42 additions, 16 shifts)

| Group's Common Factor | C | Original Value | Rational Dyadic Constant | Multiplication of x with one or two rational dyadic constants | | Num of Adds | Num of Shifts |
|---|---|---|---|---|---|---|---|
| 1/$F_1$ = 1.0000442471 | $\alpha_1$ | 1 | 1 | y = x | | 0 | 0 |
| | $\beta_1$ | $\cos(\pi/4)$ | $\frac{181}{256}$ | $y_2 = x + (x >> 2);$<br>$y_3 = x - (y_2 >> 2);$<br>$y = y_3 + (y_2 >> 6);$ | // 101<br>// 01011<br>// 010110101 | 3 | 3 |
| 1/$F_2$ = 1.0000442471 | $\alpha_2$ | 1 | 1 | y = x; | 0 | 0 | |
| | $\beta_2$ | $\cos(\pi/4)$ | $\frac{181}{256}$ | $y_2 = x + (x >> 2);$<br>$y_3 = x - (y_2 >> 2);$<br>$y = y_3 + (y_2 >> 6);$ | // 101<br>// 01011<br>// 010110101 | 3 | 3 |
| | $\gamma_2$ | $\cos(3\pi/8)$ | $\frac{3135}{8192}$ | $w_2 = x - (x >> 4);$<br>$w_3 = w_2 + (x >> 10);$ | // 01111<br>// 01111000001 | 4 | 5 |
| | $\delta_2$ | $\sin(3\pi/8)$ | $\frac{473}{512}$ | $y = (x - (w_3 >> 2)) >> 1;$<br>$z = w_3 - (w_2 >> 6);$ | // 00110000111111<br>// 0111011001 | | |

Table 2 gives the details of algorithm B, which uses a common factor of 1/1.0000442471 for the first group and a common factor of 1/1.02053722659 for the second group.

TABLE 2

Approximation B (43 additions, 17 shifts)

| Group's Common Factor | C | Original Value | Rational Dyadic Constant | Multiplication of x with one or two rational dyadic constants | | Num of Adds | Num of Shifts |
|---|---|---|---|---|---|---|---|
| 1/$F_1$ = 1.0000442471 | $\alpha_1$ | 1 | 1 | y = x | | 0 | 0 |
| | $\beta_1$ | $\cos(\pi/4)$ | $\frac{181}{256}$ | $y_2 = x + (x >> 2);$<br>$y_3 = x - (y_2 >> 2);$<br>$y = y_3 + (y_2 >> 6);$ | // 101<br>// 01011<br>// 010110101 | 3 | 3 |

TABLE 2-continued

| Approximation B (43 additions, 17 shifts) | | | | | | | |
|---|---|---|---|---|---|---|---|
| Group's Common Factor | C | Original Value | Rational Dyadic Constant | Multiplication of x with one or two rational dyadic constants | | Num of Adds | Num of Shifts |
| $1/F_2 =$ 1.02053722659 | $\alpha_2$ | 1 | $\frac{8027}{8192}$ | $y_2 = y + (y \gg 5);$<br>$y_3 = y_2 + (y_2 \gg 2);$<br>$y = x - (y_3 \gg 6);$ | // 100001<br>// 10100101<br>// 01111101011011 | 3 | 3 |
| | $\beta_2$ | $\cos(\pi/4)$ | $\frac{1419}{2048}$ | $y_2 = x + (x \gg 7);$<br>$y_3 = y_2 \gg 1;$<br>$y_4 = y_2 + y_3;$<br>$y = y_3 + (y_4 \gg 3);$ | // 10000001<br>// 010000001<br>// 110000011<br>// 010110001011 | 3 | 3 |
| | $\gamma_2$<br>$\delta_2$ | $\cos(3\pi/8)$<br>$\sin(3\pi/8)$ | 3/8<br>$\frac{927}{1024}$ | $w_2 = x + (x \gg 1);$<br>$w_3 = w_2 + (x \gg 6);$<br>$y = x - (w_3 \gg 4);$<br>$z = w_2 \gg 2;$ | // 11<br>// 1100001<br>// 01110011111<br>// 0011 | 3 | 4 |

Table 3 gives the details of algorithm C, which uses a common factor of 1/0.87734890555 for the first group and a common factor of 1/1.02053722659 for the second group.

TABLE 3

| Approximation C (44 additions, 18 shifts) | | | | | | | |
|---|---|---|---|---|---|---|---|
| Group's Common Factor | C | Original Value | Rational Dyadic Constant | Multiplication of x with one or two rational dyadic constants | | Num of Adds | Num of Shifts |
| $1/F_1 =$ 0.87734890555 | $\alpha_1$ | 1 | $\frac{577}{512}$ | $y_2 = x + (x \gg 6);$<br>$y = x + (y_2 \gg 3);$ | // 1000001<br>// 1001000001 | 2 | 2 |
| | $\beta_1$ | $\cos(\pi/4)$ | $\frac{51}{64}$ | $y_2 = x - (x \gg 2);$<br>$y = y_2 + (y_2 \gg 4);$ | // 011<br>// 0110011 | 2 | 2 |
| $1/F_2 =$ 1.02053722659 | $\alpha_2$ | 1 | $\frac{8027}{8192}$ | $y_2 = x + (x \gg 5);$<br>$y_3 = y_2 + (y_2 \gg 2);$<br>$y = x - (y_3 \gg 6);$ | // 100001<br>// 10100101<br>// 01111101011011 | 3 | 3 |
| | $\beta_2$ | $\cos(\pi/4)$ | $\frac{1419}{2048}$ | $y_2 = x + (x \gg 7);$<br>$y_3 = y_2 \gg 1;$<br>$y_4 = y_2 + y_3;$<br>$y = y_3 + (y_4 \gg 3);$ | // 10000001<br>// 010000001<br>// 110000011<br>// 010110001011 | 3 | 3 |
| | $\gamma_2$<br>$\delta_2$ | $\cos(3\pi/8)$<br>$\sin(3\pi/8)$ | 3/8<br>$\frac{927}{1024}$ | $w_2 = x + (x \gg 1);$<br>$w_3 = w_2 + (x \gg 6);$<br>$y = x - (w_3 \gg 4);$<br>$z = w_2 \gg 2;$ | // 11<br>// 1100001<br>// 01110011111<br>// 0011 | 3 | 4 |

Table 4 gives the details of algorithm D, which uses a common factor of 1/0.87734890555 for the first group and a common factor of 1/0.89062054308 for the second group.

TABLE 4

| Approximation D (45 additions, 17 shifts) | | | | | | | |
|---|---|---|---|---|---|---|---|
| Group's Common Factor | C | Original Value | Rational Dyadic Constant | Multiplication of x with one or two rational dyadic constants | | Num of Adds | Num of Shifts |
| $1/F_1 =$ 0.87734890555 | $\alpha_1$ | 1 | $\frac{577}{512}$ | $y_2 = x + (x \gg 6);$<br>$y = x + (y_2 \gg 3);$ | // 1000001<br>// 1001000001 | 2 | 2 |
| | $\beta_1$ | $\cos(\pi/4)$ | $\frac{51}{64}$ | $y_2 = x - (x \gg 2);$<br>$y = y_2 + (y_2 \gg 4);$ | // 011<br>// 0110011 | 2 | 2 |
| $1/F_2 =$ 0.89062054308 | $\alpha_2$ | 1 | $\frac{4599}{4096}$ | $y_2 = x - (x \gg 9);$<br>$y = y_2 + (y_2 \gg 3);$ | // 0111111111<br>// 1000111110111 | 2 | 2 |
| | $\beta_2$ | $\cos(\pi/4)$ | $\frac{813}{1024}$ | $y_2 = x - (x \gg 4);$<br>$y_3 = x + (y_2 \gg 4);$<br>$y = y_3 - (y_3 \gg 2);$ | // 01111<br>// 100001111<br>// 01100101101 | 3 | 3 |
| | $\gamma_2$<br>$\delta_2$ | $\cos(3\pi/8)$<br>$\sin(3\pi/8)$ | 55/128<br>$\frac{4249}{4096}$ | $w_2 = x + (x \gg 3);$<br>$w_3 = w_2 \gg 4;$<br>$w_4 = w_2 + w_3;$<br>$y = x + (w_4 \gg 5);$<br>$z = (x \gg 1) - w_3;$ | // 1001<br>// 00001001<br>// 10011001<br>// 1000010011001<br>// 00110111 | 4 | 4 |

Table 5 gives the details of algorithm E, which uses a common factor of 1/0.87734890555 for the first group and a common factor of 1/1.22387468002 for the second group.

and may pre-multiply each transform coefficient by a constant $C=2^P$, or shift each transform coefficient by P bits to the left, where P denotes the number of reserved "mantissa" bits.

TABLE 5

Approximation E (48 additions, 20 shifts)

| Group's Common Factor | C | Original Value | Rational Dyadic Constant | Multiplication of x with one or two rational dyadic constants | | Num of Adds | Num of Shifts |
|---|---|---|---|---|---|---|---|
| $1/F_1 =$ 0.87734890555 | $\alpha_1$ | 1 | $\frac{577}{512}$ | $y_2 = x + (x \gg 6);$<br>$y = x + (y_2 \gg 3);$ | // 1000001<br>// 1001000001 | 2 | 2 |
| | $\beta_1$ | $\cos(\pi/4)$ | $\frac{51}{64}$ | $y_2 = x - (x \gg 2);$<br>$y = y_2 + (y_2 \gg 4);$ | // 011<br>// 0110011 | 2 | 2 |
| $1/F_2 =$ 1.22387468002 | $\alpha_2$ | 1 | $\frac{13387}{2^{14}}$ | $y_2 = x - (x \gg 4);$<br>$y_3 = x \gg 1;$<br>$y_4 = y_3 + (y_2 \gg 7);$<br>$y_5 = y_4 + (y_4 \gg 2);$<br>$y = y_3 + (y_5 \gg 1);$ | // 01111<br>// 01<br>// 010000001111<br>// 01010001001011<br>// 011010001001011 | 4 | 5 |
| | $\beta_2$ | $\cos(\pi/4)$ | $\frac{4733}{8192}$ | $y_2 = x \gg 1;$<br>$y_3 = x + y_2;$<br>$y_4 = x + y_3;$<br>$y_5 = y_2 + (y_4 \gg 5);$<br>$y = y_5 - (y_3 \gg 12);$ | // 01<br>// 11<br>// 101<br>// 0100101<br>// 01001001111101 | 4 | 3 |
| | $\gamma_2$<br>$\delta_2$ | $\cos(3\pi/8)$<br>$\sin(3\pi/8)$ | $5123/2^{14}$<br>$\frac{773}{1024}$ | $w_2 = x \gg 2;$<br>$w_3 = x - w_2;$<br>$w_4 = w_2 + (x \gg 4);$<br>$y = w_3 + (w_4 \gg 6);$<br>$z = w_4 + (w_3 \gg 12);$ | // 001<br>// 011<br>// 00101<br>// 01100000101<br>// 001010000000011 | 4 | 4 |

The precision of the output samples from an approximate IDCT may be quantified based on metrics defined in IEEE Standard 1180-1190 and its pending replacement. This standard specifies testing a reference 64-bit floating-point DCT followed by the approximate IDCT using data from a random number generator. The reference DCT receives random data for a block of input pixels and generates transform coefficients. The approximate IDCT receives the transform coefficients (appropriately rounded) and generates a block of reconstructed pixels. The reconstructed pixels are compared against the input pixels using five metrics, which are given in Table 6. Additionally, the approximate IDCT is required to produce all zeros when supplied with zero transform coefficients and to demonstrate near-DC inversion behavior. All five algorithms A through E given above pass all of the metrics in Table 6.

TABLE 6

| Metric | Description | Requirement |
|---|---|---|
| p | Maximum absolute difference between reconstructed pixels | $p \leq 1$ |
| d[x, y] | Average differences between pixels | $|d[x, y]| \leq 0.015$ for all [x, y] |
| m | Average of all pixel-wise differences | $|m| \leq 0.0015$ |
| e[x, y] | Average square difference between pixels | $|e[x, y]| \leq 0.06$ for all [x, y] |
| n | Average of all pixel-wise square differences | $|n| \leq 0.02$ |

The 1D IDCT shown in FIG. 3 may be used for a 2D IDCT. Similarly, the 1D DCT shown in FIG. 4 may be used for a 2D DCT.

Figure 6:
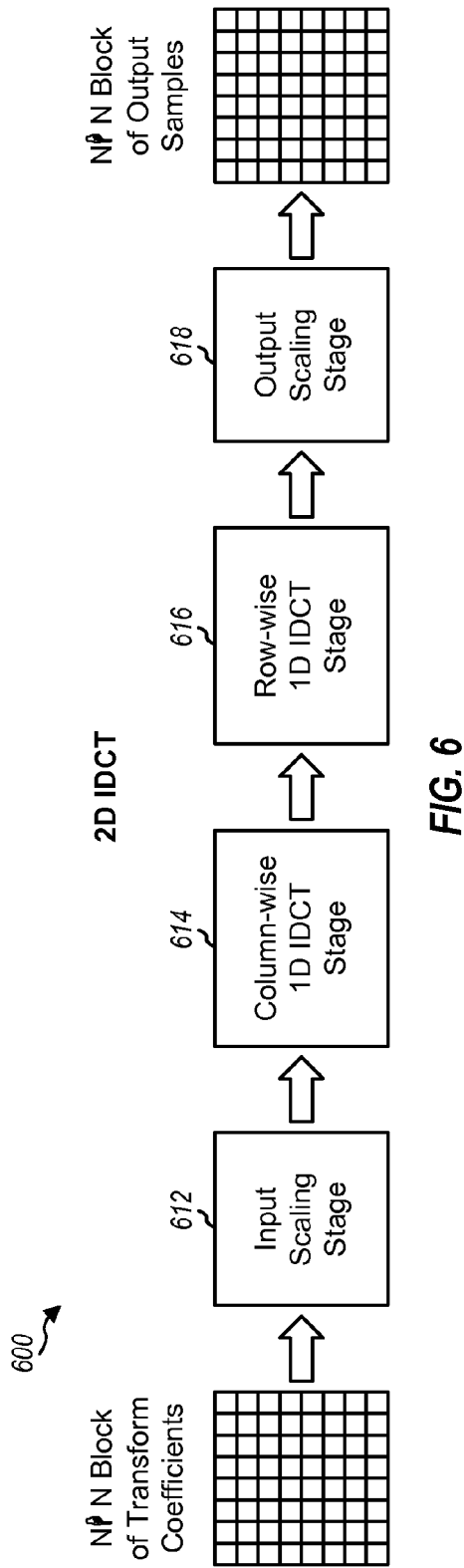
FIG. 6 shows a block diagram of a two-dimensional (2D) IDCT.

FIG. 6 shows a design of a 2D IDCT 600 implemented in a scaled and separable fashion. 2D IDCT 600 comprises an input scaling stage 612, followed by a first scaled 1D IDCT stage 614 for the columns (or rows), further followed by a second scaled 1D IDCT stage 616 for the rows (or columns), and concluding with an output scaling stage 618. Input scaling stage 612 receives an 8×8 block of transform coefficients and may pre-multiply each transform coefficient by a constant $C=2^P$, or shift each transform coefficient by P bits to the left, where P denotes the number of reserved "mantissa" bits.

After the scaling, a quantity of $2^{P-1}$ may be added to the DC transform coefficient to achieve the proper rounding in the output samples. To improve precision of scaling, S=P+R bits may be used in the conversion of the scale factors to integers, and right shifts by R bits may be performed after multiplications. S may be any suitable value that can facilitate implementations on hardware platforms, e.g., S may be 15 or 16 for platforms with signed/unsigned 16-bit multipliers.

First 1D IDCT stage 614 performs an 8-point IDCT on each column of the block of scaled transform coefficients. Second 1D IDCT stage 616 performs an 8-point IDCT on each row of an intermediate block generated by first 1D IDCT stage 614. The 1D IDCTs for the first and second stages may operate directly on their input data without doing any internal pre- or post scaling. After both the rows and columns are processed, output scaling stage 618 may shift the resulting quantities from second 1D IDCT stage 616 by P bits to the right to generate the output samples for the 2D IDCT. The scale factors and the precision constant P may be chosen such that the entire 2D IDCT may be implemented using registers of the desired width.

The 2D DCT may be performed in similar manner as the 2D IDCT. The 2D DCT may be performed by (a) pre-multiplying a block of spatial domain samples, (b) performing 1D DCT on each column (or row) of the block of scaled samples to generate an intermediate block, (c) performing 1D DCT on each row (or column) of the intermediate block, and (d) scaling the output of the second 1D DCT stage to generate a block of transform coefficients for the 2D DCT.

For clarity, much of the description above is for an 8-point scaled IDCT and an 8-point scaled DCT. The techniques described herein may be used for any type of transform such as DCT, IDCT, DFT, 1DFT, MLT, inverse MLT, MCLT, inverse MCLT, etc. The techniques may also be used for any factorization of a transform, with several example factorizations being given in FIGS. 1 through 4. The groups for the common factors may be selected based on the factorization, as described above. The techniques may also be used for transforms of any size, with example 8-point transforms being given in FIGS. 1 through 4. The techniques may also be used in conjunction with any common factor selection criteria such as total number of logical and arithmetic operations, total number of arithmetic operations, precision of the results, etc.

The number of operations for a transform may be dependent on the manner in which multiplications are performed. The computation techniques described above unroll multiplications into series of shift and add operations, use intermediate results to reduce the number of operations, and perform joint multiplication with multiple constants using a common series. The multiplications may also be performed with other computation techniques, which may influence the selection of the common factors.

The transforms with common factors described herein may provide certain advantages such as:
Lower multiplication complexity due to merged multiplications in a scaled phase,
Possible reduction in complexity due to ability to merge scaling with quantization in implementations of JPEG, H.263, MPEG-1, MPEG-2, MPEG-4 (P.2), and other standards, and
Improved precision due to ability to minimize/distribute errors of fixed-point approximations for irrational constants used in multiplications by introducing common factors that can be accounted for by scale factors.

Transforms with common factors may be used for various applications such as image and video processing, communication, computing, data networking, data storage, graphics, etc. Example use of transforms for video processing is described below.

Figure 7:
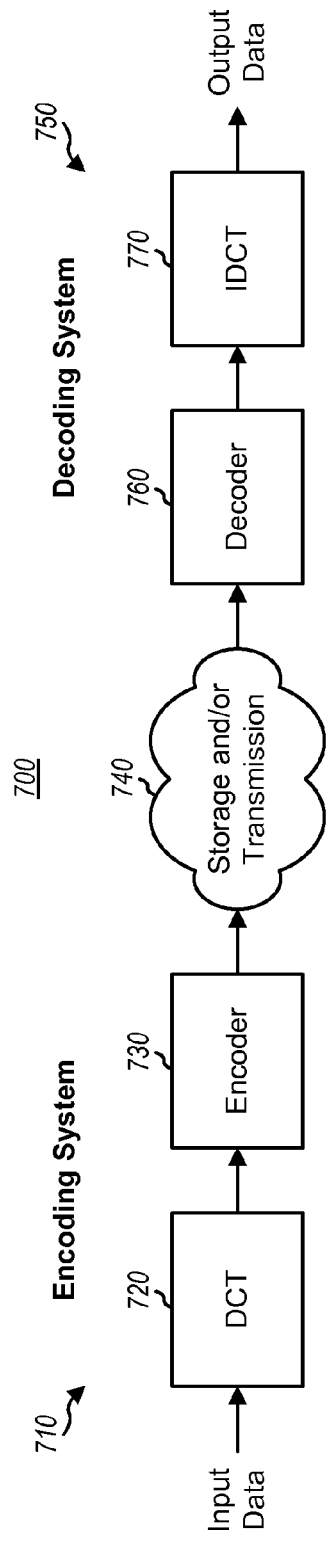
FIG. 7 shows a block diagram of an image/video encoding and decoding system.

FIG. 7 shows a block diagram of an image/video encoding and decoding system 700. At an encoding system 710, a DCT unit 720 receives an input data block and generates a transform coefficient block. The input data block may be an N×N block of pixels, an N×N block of pixel difference values (or residue), or some other type of data generated from a source signal, e.g., a video signal. The pixel difference values may be differences between two blocks of pixels, differences between a block of pixels and a block of predicted pixels, etc. N may be equal to 8 or some other value. An encoder 730 receives the transform coefficient block from DCT unit 720, encodes the transform coefficients, and generates compressed data. The compressed data may be stored in a storage unit and/or sent via a communication channel (cloud 740).

At a decoding system 760, a decoder 760 receives the compressed data from storage unit or communication channel 740 and reconstructs the transform coefficients. An IDCT unit 770 receives the reconstructed transform coefficients and generates an output data block. The output data block may be an N×N block of reconstructed pixels, an N×N block of reconstructed pixel difference values, etc. The output data block may be an estimate of the input data block provided to DCT unit 720 and may be used to reconstruct the source signal.

Figure 8:
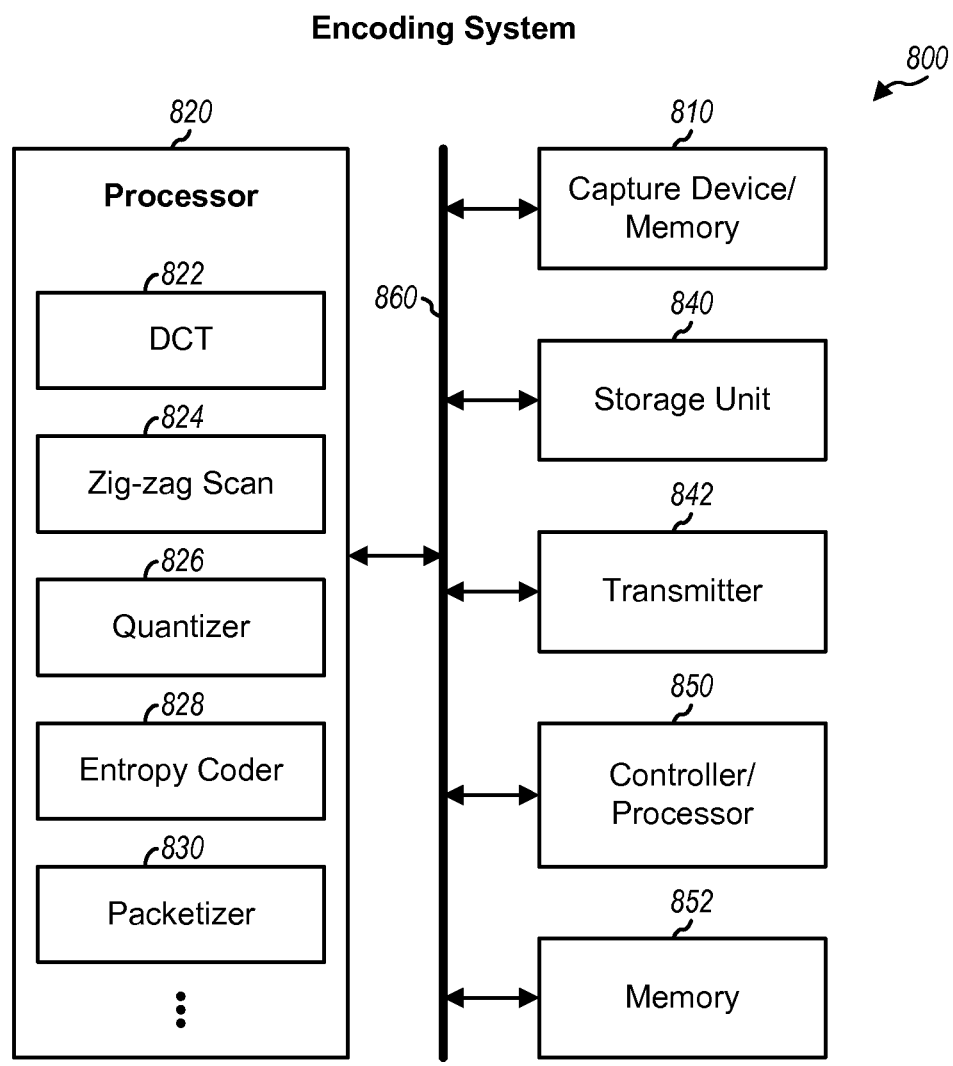
FIG. 8 shows a block diagram of an encoding system.

FIG. 8 shows a block diagram of an encoding system 800, which may be used for encoding system 710 in FIG. 7. A capture device/memory 810 may receive a source signal, perform conversion to digital format, and provides input/raw data. Capture device 810 may be a video camera, a digitizer, or some other device. A processor 820 processes the raw data and generates compressed data. Within processor 820, the raw data may be transformed by a DCT unit 822, scanned by a zig-zag scan unit 824, quantized by a quantizer 826, encoded by an entropy encoder 828, and packetized by a packetizer 830. DCT unit 822 may perform 2D DCTs on the raw data in accordance with the techniques described above.

Each of units 822 through 830 may be implemented a hardware, firmware and/or software. For example, DCT unit 822 may be implemented with dedicated hardware, a set of instructions for an arithmetic logic unit (ALU), etc.

A storage unit 840 may store the compressed data from processor 820. A transmitter 842 may transmit the compressed data. A controller/processor 850 controls the operation of various units in encoding system 800. A memory 852 stores data and program codes for encoding system 800. One or more buses 860 interconnect various units in encoding system 800.

Figure 9:
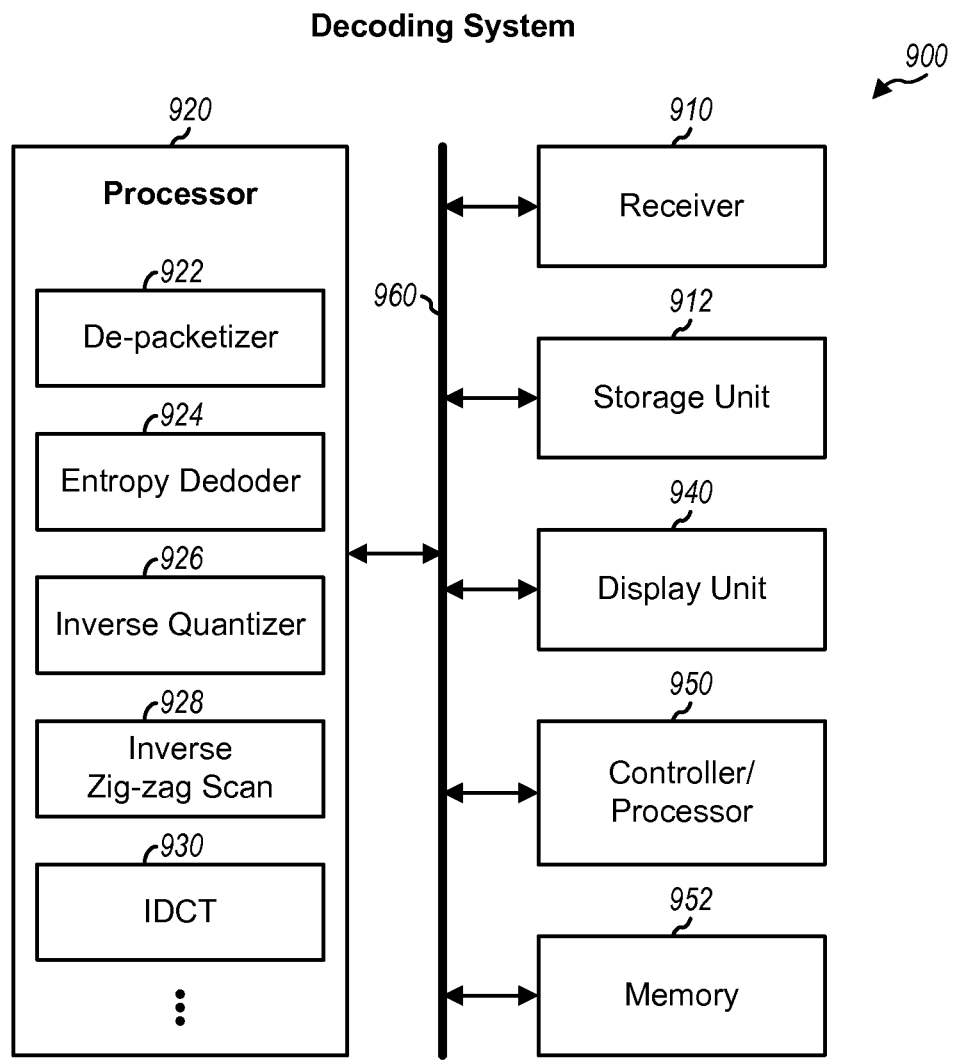
FIG. 9 shows a block diagram of a decoding system.

FIG. 9 shows a block diagram of a decoding system 900, which may be used for decoding system 750 in FIG. 7. A receiver 910 may receive compressed data from an encoding system, and a storage unit 912 may store the received compressed data. A processor 920 processes the compressed data and generates output data. Within processor 920, the compressed data may be de-packetized by a de-packetizer 922, decoded by an entropy decoder 924, inverse quantized by an inverse quantizer 926, placed in the proper order by an inverse zig-zag scan unit 928, and transformed by an IDCT unit 930. IDCT unit 930 may perform 2D IDCTs on the reconstructed transform coefficients in accordance with the techniques described above. Each of units 922 through 930 may be implemented a hardware, firmware and/or software. For example, IDCT unit 930 may be implemented with dedicated hardware, a set of instructions for an ALU, etc.

A display unit 940 displays reconstructed images and video from processor 920. A controller/processor 950 controls the operation of various units in decoding system 900. A memory 952 stores data and program codes for decoding system 900. One or more buses 960 interconnect various units in decoding system 900.

Processors 820 and 920 may each be implemented with one or more application specific integrated circuits (ASICs), digital signal processors (DSPs), and/or some other type of processors. Alternatively, processors 820 and 920 may each be replaced with one or more random access memories (RAMs), read only memory (ROMs), electrical programmable ROMs (EPROMs), electrically erasable programmable ROMs (EEPROMs), magnetic disks, optical disks, and/or other types of volatile and nonvolatile memories known in the art.

The techniques described herein may be implemented in hardware, firmware, software, or a combination thereof. For example, the logical (e.g., shift) and arithmetic (e.g., add) operations for multiplication of a data value with a constant value may be implemented with one or more logics, which may also be referred to as units, modules, etc. A logic may be hardware logic comprising logic gates, transistors, and/or other circuits known in the art. A logic may also be firmware and/or software logic comprising machine-readable codes.

In one design, an apparatus comprises a first logic to perform multiplication of a first group of at least one data value with a first group of at least one rational dyadic constant that approximates a first group of at least one irrational constant scaled by a first common factor. The apparatus further comprises a second logic to perform multiplication of a second group of at least one data value with a second group of at least one rational dyadic constant that approximates a second group of at least one irrational constant scaled by a second common factor. The first and second groups of at least one data value have different sizes. The first and second logic may be separate logics, the same common logic, or shared logic.

For a firmware and/or software implementation, multiplication of a data value with a constant value may be achieved with machine-readable codes that perform the desired logical and arithmetic operations. The codes may be hardwired or stored in a memory (e.g., memory 852 in FIG. 8 or 952 in FIG. 9) and executed by a processor (e.g., processor 850 or 950) or some other hardware unit.

The techniques described herein may be implemented in various types of apparatus. For example, the techniques may be implemented in different types of processors, different types of integrated circuits, different types of electronics devices, different types of electronics circuits, etc.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure may be implemented or performed with a general-purpose processor, a DSP, an ASIC, a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the present disclosure. Various modifications to the disclosure may be readily apparent to those skilled in the art, and the generic principles defined herein may be applied to other designs without departing from the spirit or scope of the disclosure. Thus, the present disclosure is not intended to be limited to the examples shown herein but is to be accorded the widest scope consistent with the principles and novel features disclosed herein.

What is claimed is:

1. An apparatus comprising:
    at least one processor;
    a first logic implemented using the at least one processor to perform multiplication of a first group of at least one data value with a first group of at least one rational dyadic constant that approximates a first group of at least one irrational constant scaled by a first common factor, each rational dyadic constant being a rational number with a dyadic denominator; and
    a second logic implemented using the at least one processor to perform multiplication of a second group of at least one data value with a second group of at least one rational dyadic constant that approximates a second group of at least one irrational constant scaled by a second common factor, the first and second groups of at least one data value having different sizes,
    wherein the first common factor is selected to minimize a number of logical operations for the multiplication of the first group of at least one data value with the first group of at least one rational dyadic constant, and the second common factor is selected to minimize a number of logical operations for the multiplication of the second group of at least one data value with the second group of at least one rational dyadic constant, and further wherein the numbers of logical operations are pre-computed for joint multiplication of an intermediate variable with different possible values of two rational dyadic constants and stored in a data structure, wherein the number of logical operations for the multiplication of the first group is dependent on the value of the rational dyadic constant.

2. The apparatus of claim 1, further comprising:
    a third logic to perform multiplication of a third group of at least one data value with a third group of at least one rational dyadic constant that approximates a third group of at least one irrational constant scaled by a third common factor.

3. The apparatus of claim 1, wherein the second group of at least one data value is twice the size of the first group of at least one data value.

4. The apparatus of claim 1, wherein the first group of at least one data value comprises two data values and the second group of at least one data value comprises four data values.

5. The apparatus of claim 1, wherein the first group of at least one irrational constant comprises a single irrational constant and the second group of at least one irrational constant comprises three irrational constants.

6. The apparatus of claim 1, wherein the number of irrational constants in the first group is fewer than the number of rational dyadic constants in the first group.

7. The apparatus of claim 1, wherein the first logic performs multiplication of a first data value in the first group with a first rational dyadic constant that approximates the first common factor, and performs multiplication of a second data value in the first group with a second rational dyadic constant that approximates an irrational constant scaled by the first common factor.

8. The apparatus of claim 1, wherein the second group of at least one irrational constant comprises first and second irrational constants, wherein the second group of at least one rational dyadic constant comprises a first rational dyadic constant that approximates the first irrational constant scaled by the second common factor and a second rational dyadic constant that approximates the second irrational constant scaled by the second common factor.

9. The apparatus of claim 8, wherein the second logic performs multiplication of a data value in the second group with the first rational dyadic constant, and performs multiplication of the data value with the second rational dyadic constant.

10. The apparatus of claim 8, wherein the second logic performs multiplication of a data value in the second group with the first and second rational dyadic constants using a single series of intermediate values.

11. The apparatus of claim 1, wherein the logical operations comprise shift operations.

12. The apparatus of claim 1, wherein the first and second common factors are selected further based on at least one precision metric for results generated from the multiplication.

13. The apparatus of claim 1, wherein the first common factor is selected by determining the number of logical operations for multiplication of the first group of at least one data value with different possible values for the first group of at least one rational dyadic constant obtained with different possible values of the first common factor.

14. The apparatus of claim 1, wherein for multiplication of a data value in the first group with a rational dyadic constant in the first group, the first logic generates a series of intermediate values based on the data value, with at least one intermediate value in the series being generated based on at least one other intermediate value in the series, and provides one intermediate value in the series as an output value for the multiplication of the data value with the rational dyadic constant.

15. The apparatus of claim 1, wherein the first and second logics perform the multiplication for a linear transform.

16. The apparatus of claim 15, further comprising:
a third logic to perform at least one butterfly operation based on outputs of the first and second logics to generate results for the linear transform.

17. The apparatus of claim 1, wherein the first and second logics perform the multiplication for a discrete cosine transform (DCT).

18. The apparatus of claim 1, wherein the first and second logics perform the multiplication for an inverse discrete cosine transform (IDCT).

19. The apparatus of claim 1, wherein the first and second logics perform the multiplication for an 8-point discrete cosine transform (DCT) or an 8-point inverse discrete cosine transform (IDCT).

20. The apparatus of claim 1, wherein a single series of intermediate values is used to perform multiplication of at least one data value with the first group or the second group.

21. An apparatus comprising:
at least one processor;
a first logic implemented using the at least one processor to perform multiplication of a first group of two data values with a first group of two rational dyadic constants that approximates a first group of at least one irrational constant scaled by a first common factor, each rational dyadic constant being a rational number with a dyadic denominator; and
a second logic implemented using the at least one processor to perform multiplication of a second group of four data values with a second group of four rational dyadic constants that approximates a second group of at least one irrational constant scaled by a second common factor,
wherein the first common factor is selected to minimize a number of logical operations for the multiplication of the first group of two data values with the first group of two rational dyadic constants, and the second common factor is selected to minimize a number of logical operations for the multiplication of the second group of four data values with the second group of four rational dyadic constants, and further wherein the numbers of logical operations are pre-computed for joint multiplication of an intermediate variable with different possible values of two rational dyadic constants and stored in a data structure, wherein the number of logical operations for the multiplication of the first group is dependent on the value of the rational dyadic constant.

22. A method comprising:
performing multiplication of a first group of at least one data value with a first group of at least one rational dyadic constant that approximates a first group of at least one irrational constant scaled by a first common factor by a first logic of at least one processor, each rational dyadic constant being a rational number with a dyadic denominator; and
performing multiplication of a second group of at least one data value with a second group of at least one rational dyadic constant that approximates a second group of at least one irrational constant scaled by a second common factor by a second logic of the at least one processor, the first and second groups of at least one data value having different sizes,
wherein the first common factor is selected to minimize a number of logical operations for the multiplication of the first group of at least one data value with the first group of at least one rational dyadic constant, and the second common factor is selected to minimize a number of logical operations for the multiplication of the second group of at least one data value with the second group of at least one rational dyadic constant, and further wherein the numbers of logical operations are pre-computed for joint multiplication of an intermediate variable with different possible values of two rational dyadic constants and stored in a data structure, wherein the number of logical operations for the multiplication of the first group is dependent on the value of the rational dyadic constant.

23. The method of claim 22, further comprising:
performing multiplication of a third group of at least one data value with a third group of at least one rational dyadic constant that approximates a third group of at least one irrational constant scaled by a third common factor.

24. The method of claim 22, wherein the performing multiplication of the first group of at least one data value comprises, for multiplication of a data value in the first group with a rational dyadic constant in the first group,
generating a series of intermediate values based on the data value, with at least one intermediate value in the series being generated based on at least one other intermediate value in the series, and
providing one intermediate value in the series as an output value for the multiplication of the data value with the rational dyadic constant.

25. The method of claim 22, wherein the performing multiplication of the second group of at least one data value comprises performing multiplication of a data value in the second group with first and second rational dyadic constants in the second group based on a single series of intermediate values.

26. An apparatus comprising:
at least one processor;
means for performing multiplication of a first group of at least one data value with a first group of at least one rational dyadic constant that approximates a first group of at least one irrational constant scaled by a first common factor, each rational dyadic constant being a rational number with a dyadic denominator; and
means for performing multiplication of a second group of at least one data value with a second group of at least one rational dyadic constant that approximates a second group of at least one irrational constant scaled by a second common factor, the first and second groups of at least one data value having different sizes,
wherein both means for performing multiplication are implemented using the least one processor, and the first common factor is selected to minimize a number of logical operations for the multiplication of the first group of at least one data value with the first group of at least one rational dyadic constant, and the second common factor is selected to minimize a number of logical operations for the multiplication of the second group of at least one data value with the second group of at least one rational dyadic constant, and further wherein the numbers of logical operations are pre-computed for joint multiplication of an intermediate variable with different possible values of two rational dyadic constants and stored in a data structure, wherein the number of logical operations for the multiplication of the first group is dependent on the value of the rational dyadic constant.

27. The apparatus of claim 26, further comprising:
means for performing multiplication of a third group of at least one data value with a third group of at least one rational dyadic constant that approximates a third group of at least one irrational constant scaled by a third common factor.

28. The apparatus of claim 26, wherein the means for performing multiplication of the first group of at least one data value comprises, for multiplication of a data value in the first group with a rational dyadic constant in the first group,
means for generating a series of intermediate values based on the data value, with at least one intermediate value in the series being generated based on at least one other intermediate value in the series, and
means for providing one intermediate value in the series as an output value for the multiplication of the data value with the rational dyadic constant.

29. The apparatus of claim 26, wherein the means for performing multiplication of the second group of at least one data value comprises means for performing multiplication of a data value in the second group with first and second rational dyadic constants in the second group based on a single series of intermediate values.

30. An apparatus comprising:
at least one processor;
a first logic implemented using the at least one processor to receive at least one data value; and
a second logic implemented using the at least one processor to perform multiplication of the at least one data value with at least one rational dyadic constant that approximates at least one irrational constant scaled by a common factor, each rational dyadic constant being a rational number with a dyadic denominator, the common factor being selected to minimize a number of logical operations for the multiplication of the at least one data value with the at least one rational dyadic constant, wherein the number of logical operations are pre-computed for joint multiplication of an intermediate variable with different possible values of two rational dyadic constants and stored in a data structure, wherein the number of logical operations for the multiplication is dependent on the value of the rational dyadic constant.

31. The apparatus of claim 30, wherein the logical operations comprise shift operations.

32. The apparatus of claim 30, wherein the common factor is selected further based on at least one precision metric for results generated from the multiplication of the at least one data value with the at least one rational dyadic constant.

33. The apparatus of claim 30, wherein for multiplication of a data value with a rational dyadic constant, the second logic generates a series of intermediate values based on the data value, with at least one intermediate value in the series being generated based on at least one other intermediate value in the series, and provides one intermediate value in the series as an output value for the multiplication of the data value with the rational dyadic constant.

34. The apparatus of claim 30, wherein the number of logical operations is determined by performing multiplication of the at least one data value with the at least one rational dyadic constant using intermediate results to generate at least one output value for the multiplication.

35. A method comprising:
receiving at least one data value by a first logic of at least one processor; and
performing multiplication of the at least one data value with at least one rational dyadic constant that approximates at least one irrational constant scaled by a common factor by a second logic of the at least one processor, each rational dyadic constant being a rational number with a dyadic denominator, the common factor being selected to minimize a number of logical operations for the multiplication of the at least one data value with the at least one rational dyadic constant, wherein the number of logical operations are pre-computed for joint multiplication of an intermediate variable with different possible values of two rational dyadic constants and stored in a data structure, wherein the number of logical operations for the multiplication is dependent on the value of the rational dyadic constant.

36. The method of claim 35, wherein the logical operations comprise shift operations.

37. The method of claim 35, wherein the performing multiplication comprises, for multiplication of a data value with a rational dyadic constant, generating a series of intermediate values based on the data value, with at least one intermediate value in the series being generated based on at least one other intermediate value in the series, and providing one intermediate value in the series as an output value for the multiplication of the data value with the rational dyadic constant.

38. An apparatus comprising:

at least one processor;

means for receiving at least one data value; and means for performing multiplication of the at least one data value with at least one rational dyadic constant that approximates at least one irrational constant scaled by a common factor, each rational dyadic constant being a rational number with a dyadic denominator, the common factor being selected to minimize a number of logical operations for the multiplication of the at least one data value with the at least one rational dyadic constant, wherein the number of logical operations are pre-computed for joint multiplication of an intermediate variable with different possible values of two rational dyadic constants and stored in a data structure, and further wherein the means for receiving and the means for performing are implemented by the at least one processor, wherein the number of logical operations for the multiplication is dependent on the value of the rational dyadic constant.

39. The apparatus of claim 38, wherein the logical operations comprise shift operations.

40. The apparatus of claim 38, wherein the means for performing multiplication comprises, for multiplication of a data value with a rational dyadic constant, means for generating a series of intermediate values based on the data value, with at least one intermediate value in the series being generated based on at least one other intermediate value in the series, and means for providing one intermediate value in the series as an output value for the multiplication of the data value with the rational dyadic constant.

41. A non-transitory computer program product, comprising:

computer-readable medium comprising:

code for causing a computer to receive at least one data value; and code for causing the computer to perform multiplication of the at least one data value with at least one rational dyadic constant that approximates at least one irrational constant scaled by a common factor, each rational dyadic constant being a rational number with a dyadic denominator, the common factor being selected to minimize a number of logical operations for the multiplication of the at least one data value with the at least one rational dyadic constant, wherein the number of logical operations are pre-computed for joint multiplication of an intermediate variable with different possible values of two rational dyadic constants and stored in a data structure, wherein the number of logical operations for the multiplication is dependent on the value of the rational dyadic constant.

42. A non-transitory computer program product, comprising:

computer-readable medium comprising:

code for causing a computer to perform multiplication of a first group of at least one data value with a first group of at least one rational dyadic constant that approximates a first group of at least one irrational constant scaled by a first common factor, each rational dyadic constant being a rational number with a dyadic denominator; and code for causing the computer to perform multiplication of a second group of at least one data value with a second group of at least one rational dyadic constant that approximates a second group of at least one irrational constant scaled by a second common factor, the first and second groups of at least one data value having different sizes, wherein the first common factor is selected to minimize a number of logical operations for the multiplication of the first group of at least one data value with the first group of at least one rational dyadic constant, and the second common factor is selected to minimize a number of logical operations for the multiplication of the second group of at least one data value with the second group of at least one rational dyadic constant, and further wherein the number of logical operations are pre-computed for joint multiplication of an intermediate variable with different possible values of two rational dyadic constants and stored in a data structure, wherein the number of logical operations for the multiplication of the first group is dependent on the value of the rational dyadic constant.

43. The non-transitory computer program product of claim 42, further comprising:

code for causing a computer to perform multiplication of a third group of at least one data value with a third group of at least one rational dyadic constant that approximates a third group of at least one irrational constant scaled by a third common factor.

\* \* \* \* \*